US008926423B2

(12) United States Patent
Filipour et al.

(10) Patent No.: US 8,926,423 B2
(45) **Date of Patent: *Jan. 6, 2015**

(54) GAMING SYSTEMS, GAMING DEVICES AND METHODS FOR PROVIDING PROGRESSIVE AWARDS

(71) Applicant: IGT, Reno, NV (US)

(72) Inventors: Cameron A. Filipour, Las Vegas, NV (US); Alexander Popovich, Henderson, NV (US); Adam M. Singer, Henderson, NV (US); Ali M. Saffari, Reno, NV (US); Bryan D. Wolf, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/869,481

(22) Filed: Apr. 24, 2013

(65) Prior Publication Data

US 2013/0237313 A1 Sep. 12, 2013

Related U.S. Application Data

(63) Continuation of application No. 12/618,372, filed on Nov. 13, 2009, now Pat. No. 8,435,111.

(51) Int. Cl.
*A63F 13/00* (2014.01)
*G07F 17/32* (2006.01)

(52) U.S. Cl.
CPC ............ *G07F 17/3295* (2013.01); *G07F 17/32* (2013.01); *G07F 17/3267* (2013.01)
USPC ........ 463/20; 463/9; 463/16; 463/17; 463/18; 463/19; 463/21; 463/25; 463/26; 463/27; 463/28

(58) Field of Classification Search
USPC .......................... 463/16–22, 25–28, 39–43, 9
See application file for complete search history.

(56) References Cited

U.S. PATENT DOCUMENTS

| | | | |
|---|---|---|---|
| 5,417,430 | A | 5/1995 | Breeding |
| 5,655,961 | A | 8/1997 | Acres et al. |

(Continued)

FOREIGN PATENT DOCUMENTS

| | | | |
|---|---|---|---|
| WO | WO 2006/130597 | A2 | 12/2006 |
| WO | WO 2007/028108 | A2 | 3/2007 |

(Continued)

OTHER PUBLICATIONS

Pong Article, from Wikipedia [online] [printed on Oct. 10, 2007]. Retrieved from the Internet at <URL: http://en.wikipedia.org/wiki/Pong>, pp. 1-8.

(Continued)

*Primary Examiner* — Sunit Pandya
(74) *Attorney, Agent, or Firm* — Neal, Gerber & Eisenberg LLP

(57) ABSTRACT

The gaming system, gaming device and method disclosed herein determines whether to provide at least one of the plurality of progressive awards to the player based on that player's measured level of skill in: (i) a plurality of plays of a partial skill-based game, (ii) a skill-based progressive award sequence, or (iii) a plurality of plays of a partial skill-based game and a skill-based progressive award sequence. The determination is based on zero, one or more inputs made by the player which tend to measure that player's level of skill in at least one of a partial skill-based game and a skill-based progressive award sequence.

23 Claims, 22 Drawing Sheets

(56) References Cited

U.S. PATENT DOCUMENTS

| | | | | |
|---|---|---|---|---|
| 5,766,076 | A | 6/1998 | Pease et al. | |
| 5,851,011 | A | 12/1998 | Lott | |
| 5,855,515 | A | 1/1999 | Pease et al. | |
| 5,876,284 | A | 3/1999 | Acres et al. | |
| 5,885,158 | A | 3/1999 | Torango et al. | |
| 6,024,642 | A | 2/2000 | Stupak | |
| 6,203,430 | B1 | 3/2001 | Walker et al. | |
| 6,224,482 | B1 | 5/2001 | Bennett | |
| 6,231,445 | B1 | 5/2001 | Acres | |
| 6,244,958 | B1 | 6/2001 | Acres | |
| 6,312,333 | B1 | 11/2001 | Acres | |
| 6,312,334 | B1 | 11/2001 | Yoseloff | |
| 6,364,768 | B1 | 4/2002 | Acres et al. | |
| 6,371,852 | B1 | 4/2002 | Acres | |
| 6,375,567 | B1 | 4/2002 | Acres | |
| 6,375,569 | B1 | 4/2002 | Acres | |
| 6,406,369 | B1 | 6/2002 | Baerlocher et al. | |
| 6,413,160 | B1 | 7/2002 | Vancura | |
| 6,454,651 | B1 | 9/2002 | Yoseloff | |
| RE37,885 | E | 10/2002 | Acres et al. | |
| 6,572,473 | B1 | 6/2003 | Baerlocher | |
| 6,599,193 | B2 | 7/2003 | Baerlocher et al. | |
| 6,607,441 | B1 | 8/2003 | Acres | |
| 6,645,075 | B1 | 11/2003 | Gatto et al. | |
| 6,692,003 | B2 | 2/2004 | Potter et al. | |
| 6,702,670 | B2 | 3/2004 | Jasper et al. | |
| 6,731,313 | B1 | 5/2004 | Kaminkow | |
| 6,752,717 | B2 | 6/2004 | Vancura | |
| 6,761,632 | B2 | 7/2004 | Bansemer et al. | |
| 6,780,103 | B2 | 8/2004 | Bansemer et al. | |
| 6,796,904 | B2 | 9/2004 | Yoseloff | |
| 6,811,482 | B2 | 11/2004 | Letovsky | |
| 6,852,027 | B2 | 2/2005 | Kaminkow et al. | |
| 6,863,606 | B1 | 3/2005 | Berg et al. | |
| 6,918,830 | B2 | 7/2005 | Baerlocher | |
| 6,939,226 | B1 | 9/2005 | Joshi | |
| 6,942,568 | B2 | 9/2005 | Baerlocher | |
| RE38,812 | E | 10/2005 | Acres et al. | |
| 6,974,385 | B2 | 12/2005 | Joshi et al. | |
| 6,984,174 | B2 | 1/2006 | Cannon et al. | |
| 6,988,732 | B2 | 1/2006 | Vancura | |
| 7,077,744 | B2 | 7/2006 | Cannon | |
| 7,077,746 | B2 | 7/2006 | Torango | |
| 7,175,521 | B2 | 2/2007 | Mcclintic | |
| 7,326,115 | B2 | 2/2008 | Baerlocher | |
| 7,338,365 | B1 | 3/2008 | Luciano, Jr. | |
| 7,357,716 | B2 | 4/2008 | Marks et al. | |
| 7,419,430 | B1 | 9/2008 | Joshi et al. | |
| 7,507,156 | B2 | 3/2009 | Nicely | |
| 7,510,473 | B2 | 3/2009 | Thomas | |
| 7,572,182 | B2 | 8/2009 | Vancura | |
| 7,575,516 | B2 | 8/2009 | Olive | |
| 7,582,014 | B2 | 9/2009 | Olive | |
| 7,597,621 | B2 | 10/2009 | Baerlocher | |
| 7,628,689 | B2 | 12/2009 | Snow | |
| 7,722,451 | B2 | 5/2010 | Hughs-Baird et al. | |
| 8,231,460 | B2 * | 7/2012 | Gauselmann | 463/27 |
| 2002/0052232 | A1 | 5/2002 | Kaminkow | |
| 2002/0090990 | A1 | 7/2002 | Joshi et al. | |
| 2002/0090991 | A1 | 7/2002 | Robb | |
| 2003/0015838 | A1 | 1/2003 | Kelly et al. | |
| 2004/0029627 | A1 | 2/2004 | Hannan et al. | |
| 2004/0048644 | A1 | 3/2004 | Gerrard et al. | |
| 2005/0026664 | A1 | 2/2005 | Bansemer et al. | |
| 2005/0071023 | A1 | 3/2005 | Gilliland et al. | |
| 2005/0096121 | A1 | 5/2005 | Gilliland et al. | |
| 2005/0197179 | A1 | 9/2005 | Moshal | |
| 2006/0025195 | A1 | 2/2006 | Pennington et al. | |
| 2006/0030403 | A1 | 2/2006 | Lafky et al. | |
| 2006/0040735 | A1 | 2/2006 | Baerlocher | |
| 2006/0073897 | A1 | 4/2006 | Englman et al. | |
| 2006/0183535 | A1 * | 8/2006 | Marks et al. | 463/20 |
| 2006/0249904 | A1 | 11/2006 | Matheson | |
| 2006/0279044 | A1 | 12/2006 | Pacey | |
| 2007/0054733 | A1 | 3/2007 | Baerlocher | |
| 2007/0060271 | A1 | 3/2007 | Cregan et al. | |
| 2007/0060314 | A1 | 3/2007 | Baerlocher et al. | |
| 2007/0060321 | A1 | 3/2007 | Vasquez et al. | |
| 2007/0072682 | A1 | 3/2007 | Crawford, III et al. | |
| 2007/0082725 | A1 | 4/2007 | Low et al. | |
| 2007/0111786 | A1 | 5/2007 | Snow | |
| 2007/0184887 | A1 | 8/2007 | Cannon | |
| 2007/0184891 | A1 | 8/2007 | Thomas | |
| 2007/0191088 | A1 | 8/2007 | Breckner et al. | |
| 2007/0218975 | A1 | 9/2007 | Iddings et al. | |
| 2007/0218982 | A1 | 9/2007 | Baerlocher | |
| 2007/0298874 | A1 | 12/2007 | Baerlocher et al. | |
| 2007/0298875 | A1 * | 12/2007 | Baerlocher et al. | 463/27 |
| 2008/0020832 | A1 | 1/2008 | Iddings et al. | |
| 2008/0020833 | A1 | 1/2008 | Baerlocher et al. | |
| 2008/0020834 | A1 | 1/2008 | Breckner et al. | |
| 2008/0020846 | A1 | 1/2008 | Vasquez et al. | |
| 2008/0039191 | A1 | 2/2008 | Cuddy | |
| 2008/0090651 | A1 | 4/2008 | Baerlocher | |
| 2008/0108406 | A1 | 5/2008 | Oberberger | |
| 2008/0108410 | A1 | 5/2008 | Baerlocher | |
| 2008/0108423 | A1 | 5/2008 | Benbrahim et al. | |
| 2008/0108425 | A1 | 5/2008 | Oberberger | |
| 2008/0108430 | A1 | 5/2008 | Evans | |
| 2008/0108431 | A1 | 5/2008 | Cuddy et al. | |
| 2008/0111308 | A1 | 5/2008 | Snow | |
| 2008/0113714 | A1 * | 5/2008 | Vallejo | 463/16 |
| 2008/0113779 | A1 | 5/2008 | Cregan | |
| 2008/0139305 | A1 * | 6/2008 | Vallejo et al. | 463/27 |
| 2008/0176647 | A1 | 7/2008 | Acres | |
| 2008/0207304 | A1 | 8/2008 | Acres | |
| 2008/0207313 | A1 | 8/2008 | Acres | |
| 2008/0248851 | A1 | 10/2008 | Bloom | |
| 2008/0268953 | A1 | 10/2008 | Acres | |
| 2008/0311980 | A1 | 12/2008 | Cannon | |
| 2009/0011826 | A1 | 1/2009 | Acres | |
| 2009/0042645 | A1 | 2/2009 | Graham et al. | |
| 2009/0061975 | A1 | 3/2009 | Ditchev | |
| 2009/0061991 | A1 | 3/2009 | Popovich et al. | |
| 2009/0061997 | A1 | 3/2009 | Popovich et al. | |
| 2009/0061998 | A1 | 3/2009 | Popovich et al. | |
| 2009/0061999 | A1 | 3/2009 | Popovich et al. | |
| 2009/0075728 | A1 | 3/2009 | Acres | |
| 2009/0088244 | A1 | 4/2009 | Nicely et al. | |
| 2009/0093299 | A1 | 4/2009 | Acres | |
| 2009/0104986 | A1 * | 4/2009 | Englman et al. | 463/27 |
| 2009/0111561 | A1 * | 4/2009 | Dewaal et al. | 463/20 |
| 2009/0124354 | A1 | 5/2009 | Acres | |
| 2009/0124355 | A1 | 5/2009 | Acres | |
| 2009/0124357 | A1 | 5/2009 | Acres | |
| 2009/0124358 | A1 | 5/2009 | Acres | |
| 2009/0124362 | A1 | 5/2009 | Cuddy et al. | |
| 2009/0124363 | A1 | 5/2009 | Baerlocher et al. | |
| 2009/0124364 | A1 | 5/2009 | Cuddy et al. | |
| 2009/0124373 | A1 | 5/2009 | Acres | |
| 2009/0131156 | A1 | 5/2009 | Acres | |
| 2009/0131158 | A1 | 5/2009 | Brunet De Courssou et al. | |
| 2009/0215523 | A1 | 8/2009 | Acres | |
| 2009/0239604 | A1 | 9/2009 | Acres | |
| 2009/0239648 | A1 | 9/2009 | Acres | |
| 2009/0239660 | A1 | 9/2009 | Acres | |
| 2009/0239661 | A1 | 9/2009 | Acres | |
| 2009/0247267 | A1 | 10/2009 | Acres | |
| 2009/0247277 | A1 | 10/2009 | Caspers et al. | |
| 2009/0253487 | A1 | 10/2009 | Gagner et al. | |
| 2009/0264171 | A1 | 10/2009 | Acres | |
| 2009/0275375 | A1 | 11/2009 | Acres | |
| 2009/0305776 | A1 | 12/2009 | Englman et al. | |
| 2009/0318214 | A1 | 12/2009 | Acres | |
| 2009/0318215 | A1 | 12/2009 | Acres | |
| 2009/0318217 | A1 | 12/2009 | Acres | |
| 2010/0004047 | A1 | 1/2010 | Acres | |
| 2010/0004053 | A1 | 1/2010 | Acres | |
| 2010/0004054 | A1 | 1/2010 | Acres | |
| 2010/0004057 | A1 | 1/2010 | Acres | |
| 2010/0004058 | A1 | 1/2010 | Acres | |
| 2010/0120498 | A1 * | 5/2010 | Cuddy et al. | 463/20 |
| 2010/0304825 | A1 | 12/2010 | Davis et al. | |

(56) References Cited

U.S. PATENT DOCUMENTS

FOREIGN PATENT DOCUMENTS

| | | | |
|---|---|---|---|
| WO | WO 2007/117502 | A2 | 10/2007 |
| WO | WO 2008/021449 | A2 | 2/2008 |
| WO | WO 2008/033877 | A2 | 3/2008 |
| WO | WO 2008/060426 | A2 | 5/2008 |
| WO | WO 2008/060978 | A2 | 5/2008 |
| WO | WO 2008/143790 | A2 | 11/2008 |

OTHER PUBLICATIONS

Slot Players Might Get New Crack At an Old Video Game Article, written by Richard Velotta [online] [printed Feb. 5, 2010]. Retrieved from Internet at <URL: http://www.casinocitytimes.com/news/article/slot-players-might-get-new-crack-at-an-old-video-game-167531>, pp. 1-3.

The Big Slot Show Article, written by Frank Legato, published by Strictly Slots in Nov. 2004, pp. 52-65.

* cited by examiner

FIG. 5A

160

| PROGRESSIVE AWARD | VALUE | POINT RANGE |
|---|---|---|
| A | $57.54 | 0 TO 1000 |
| B | $4,845.41 | 1001 TO 3000 |
| C | $13,281.97 | > 3000 |

FIG. 5B

180

| PROGRESSIVE AWARD | VALUE | POINT RANGE |
|---|---|---|
| A | $57.54 | 500 TO 1000 |
| B | $4,845.41 | 1001 TO 3000 |
| C | $13,281.97 | > 3000 |

GAMING SYSTEMS, GAMING DEVICES AND METHODS FOR PROVIDING PROGRESSIVE AWARDS

PRIORITY CLAIM

This application is a continuation of, claims priority to and the benefit of U.S. patent application Ser. No. 12/618,372, filed on Nov. 13, 2009, the entire contents of which is incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming devices which provide players awards in primary or base games are well known. Gaming devices generally require the player to place or make a wager to activate the primary or base game. In many of these gaming devices, the award is based on the player obtaining a winning symbol or symbol combination and on the amount of the wager (e.g., the higher the wager, the higher the award). Symbols or symbol combinations which are less likely to occur usually provide higher awards.

In such known gaming devices, the amount of the wager made on the primary game by the player may vary. For instance, the gaming device may enable the player to wager a minimum number of credits, such as one credit (e.g., one penny, nickel, dime, quarter or dollar) up to a maximum number of credits, such as five credits. This wager may be made by the player a single time or multiple times in a single play of the primary game. For instance, a slot game may have one or more paylines and the slot game may enable the player to make a wager on each payline in a single play of the primary game. Thus, it is known that a gaming device, such as a slot game, may enable players to make wagers of substantially different amounts on each play of the primary or base game ranging, for example, from 1 credit up to 125 credits (e.g., 5 credits on each of 25 separate paylines). Accordingly, it should be appreciated that different players play at substantially different wagering amounts or levels and at substantially different rates of play.

Secondary or bonus games are also known in gaming devices. The secondary or bonus games usually provide an additional award to the player. Secondary or bonus games usually do not require an additional wager by the player to be activated. Many secondary or bonus games are generally activated or hit upon an occurrence of a designated triggering symbol or triggering symbol combination in the primary or base game. For instance, a bonus symbol occurring on the payline on the third reel of a three reel slot machine may hit the secondary bonus game. Part of the enjoyment and excitement of playing certain gaming devices is the occurrence or triggering of the secondary or bonus game (even before the player knows how much the bonus award will be).

Other known games include non-wagering video games, such as pinball games, fighting games, sports games, puzzle games, word games, trivia games or domino games. Such non-wagering video games require the player(s) to make one or more inputs using one or more different player skills such as physical skill or mental skill. Mental skill includes knowledge and strategy, but knowledge and strategy are sometimes referred to herein separately. Games truly based on player skill or strategy enables certain players to become professionals at such games.

Games of skill are popular among certain players because those players feel a competitive edge while playing. That is, these players enjoy the feeling that a personal strength could lead to them winning one or more awards or prizes. However, certain gaming jurisdictions have not approved gaming devices which incorporate one or more elements of skill as a factor in determining whether to provide any awards to the player. Additionally, such gaming devices are often not as popular with lesser skilled or experienced players who feel disadvantaged while playing against more skilled or experienced players. Moreover, in these gaming devices, the probability of each award or outcome being generated is based on one or more aspects of player skill (which varies from player to player) and is thus somewhat less predictable. Accordingly, the average expected payout for such gaming devices often cannot be exactly determined, and is typically only determined within a range.

There is a continuing need to provide new and different gaming devices and gaming systems which incorporate one or more aspects of skill in determining which awards, such as progressive awards, are provided to players.

There is also a continuing need to provide new and different gaming devices and gaming systems which cater to higher skilled players while still accommodating lesser skilled players when determining which awards, such as progressive awards, are provided to such players.

There is another continuing need to provide new and different gaming devices and gaming systems as well as new and different ways to provide awards to players including progressive awards.

SUMMARY

In various embodiments, the gaming system, gaming device and method disclosed herein (i) determines whether a player is eligible to win one of a plurality of progressive awards based on zero, one or more inputs made by the player in a partial skill-based game or eligibility sequence, and (ii) subsequently determines whether to provide the progressive award that the player is currently eligible to win to that player based on zero, one or more inputs made the player in a skill-based or partial skill-based progressive award sequence. That is, in one embodiment, the gaming system disclosed herein determines whether a player is eligible to win at least one of a plurality of progressive awards based on that player's level of skill (as determined based on or quantified by zero, one or more inputs made by the player which tend to measure one or more aspects of that player's skill). After determining the player's eligibility to win one of the progressive awards, the gaming system determines whether or not the player wins that progressive award based on that player's level of skill (as determined based on or quantified by zero, one or more inputs made by the player which tend to measure one or more aspects of that player's skill). Accordingly, the gaming system disclosed herein determines whether a player is eligible to win one of a plurality of progressive awards and whether to provide the player with that progressive award based on that player's level of skill in: (i) a plurality of plays of a partial skill-based game, (ii) a skill-based or partial skill-based progressive award sequence, or (iii) a plurality of plays of a partial skill-based game and a skill-based or partial skill-based progressive award sequence.

In one embodiment, the partial skill-based game disclosed herein is time-based such that the player purchases a contract to repeatedly play the partial skill-based game for a designated amount of time in exchange for a designated amount of money. In another embodiment, the partial skill-based game disclosed herein is an interactive game in which the gaming system automatically wagers one of a plurality of wager components funded by the player after designated wagering events occur in association with the partial skill-based game. In these embodiments, the gaming system enables the player to cause at least one wagering event to occur in association with at least one play of a partial skill-based game. For each wagering event of the partial skill-based game, the gaming system determines whether to provide the player an award (e.g., a partial skill-based game award). The determination to provide the player an award for each wagering event is based on at least one skill component (e.g., at least one input which quantifies a player's skill to determine when a wager is placed and the amount of the placed wager) and at least one non-skill component (e.g., at least one determination, based on the determined wager, of an amount of any award) which are part of the partial-skill based game. The gaming system also determines whether to provide the player a quantity of points, wherein the determination is based, at least in part, on at least one input which quantifies a player's level of skill in the partial skill-based game. Based on any points provided to (or otherwise accumulated for) the player, the gaming system determines whether that player is eligible to win at least one of the progressive awards. That is, the gaming system disclosed herein determines which one or more of the plurality of progressive awards that the player is eligible to win (or otherwise associated with), if any, based on the quantity of points accumulated for the player as a result of the player's skill measured in the partial skill-based game. For example, the gaming system determines that the player is eligible to win a first one of the plurality of progressive awards if that player has accumulated, achieved, or reached a first quantity of points and the gaming system determines that the player is eligible to win a second, different one of the plurality of progressive awards if that player has accumulated, achieved, or reached a second, different quantity of points.

After an occurrence of a triggering event associated with the progressive award that the player is currently eligible to win, the gaming system determines whether to enable the player to play for that progressive award. If the gaming system determines to enable the player to play for that progressive award, the gaming system displays a skill-based progressive award sequence (or a partial skill-based progressive award sequence) associated with the progressive award. The gaming system determines whether to provide the progressive award to the player based, at least in part, on the player's measured level of skill in the skill-based progressive award sequence.

In one embodiment, the gaming system determines whether to provide the player an award (e.g., a partial skill-based game award), a quantity of points or both based, at least in part, on that player's measured level of skill and the wager for that play of the partial skill-based game. In one embodiment, the total quantity of points accumulated for the player form that player's score. That is, the gaming device totals the quantities of points accumulated for the player (e.g., the player's score) and increases the player's score as the total quantity of points provided to (or otherwise accumulated for) the player increases based, at least in part, on that player's level of skill in that play of the partial skill-based game. It should be appreciated that the gaming system can determine to provide the player an award (e.g., a partial skill-based game award) in addition to, or rather instead of, a quantity of points as a result of a single wagering event.

In one embodiment, in addition to providing a quantity of points to a player to form the player's score, the gaming system also maintains a plurality of progressive awards. The gaming system associates a range of points or a score level with each one of the progressive awards. For example, a first one of the progressive awards is associated with a first range of zero points to one-thousand points (e.g., a score level of 0 points to 1000 points), and a second one of the progressive awards is associated with a second range of one-thousand-one points to three-thousand points (e.g., a score level of 1001 points to 3000 points).

In one embodiment, the gaming system determines whether to associate one of the plurality of progressive awards with the player based on the player's score (e.g., the quantity of points provided to, or otherwise accumulated for, the player). In one such embodiment, the gaming system determines whether to enable the player to become eligible to win one of the plurality of progressive awards based on the range of points or score level associated with that progressive award and the player's score. For example, if the gaming system has accumulated one-thousand-two-hundred points for a first player based on that player's level of skill in the partial skill-based game, the gaming system enables the first player to become eligible to win the second progressive award because that first player's score of one-thousand-two-hundred points (e.g., that player's score of 1200 points) falls within the second range of points associated with the second progressive award (e.g., the score level of 1001 points to 3000 points). In one embodiment, the gaming system enables the first player to qualify to win, or otherwise become eligible to play for, the second progressive award in addition to any progressive awards associated with a lower range of points (e.g., the score level of 0 points to 1000 points associated with the first progressive award).

In one embodiment, the gaming system enables each player that plays the partial skill-based game to be eligible to play for at least one of the plurality of progressive awards. For example, the gaming system enables a player to start the partial skill-based game with zero points and the gaming system associates at least one of the progressive awards with a range of points including zero points (e.g., the first progressive award associated with the first range of points). In this embodiment, the gaming system enables each player of the partial skill-based game to be eligible to win one of the plurality of progressive awards independent of that player's skill in the partial skill-based game. In this embodiment, the gaming system also determines whether each player wins the progressive award(s) which that player is currently eligible for based on that player's level of skill in the progressive sequence(s) associated with such progressive award(s).

In another embodiment, the gaming system enables a plurality of players to be eligible to win one of the progressive awards based on the points each player is provided as a result of that player's skill in the partial skill-based game. In one such embodiment, if a triggering event associated with the progressive award occurs, the gaming system selects one of the plurality of players eligible for that progressive award to play for that progressive award. The gaming system displays a skill-based progressive award sequence associated with the progressive award to the selected player. The gaming system then determines whether to provide the progressive award to the selected player based, at least in part, on that player's measured level of skill in the skill-based progressive award sequence. That is, an outcome of the skill-based progressive award sequence depends upon zero, one or more inputs made by the player which tend to measure one or more aspects of that player's skill during the skill-based progressive award sequence.

In one such embodiment, the gaming system enables a plurality of, but not all of, the players to be eligible for one or more of the progressive awards based, at least in part, on each player's measured level of skill in the partial skill-based game. In one such embodiment, each player's score (e.g., the quantity of points accumulated for that player) is based on zero, one or more inputs made by the player in the partial skill-based game which tend to measure one or more aspects of that player's level of skill in the partial skill-based game. The gaming system then determines whether to individually associate (i.e., whether to enable the player to become eligible to win) one of the plurality of progressive awards based on that player's score. For example, the gaming system associates a first progressive award with a first range of points (e.g., five-hundred points to one-thousand points) and associates a second progressive award with a second, different range of points (e.g., one-thousand-one points to three-thousand points). That is, the gaming system requires the player to score at least five-hundred points to become eligible to win one of the plurality of progressive awards (e.g., the first progressive award). If the player scores five-hundred points, that player is eligible to win the first progressive award and the gaming system determines whether that player wins the first progressive award based on that player's level of skill in the progressive sequence associated with the first progressive award. If the player scores one-thousand-two-hundred points, that player is eligible to win the second progressive award and the gaming system determines whether that player wins the second progressive award based on that player's level of skill in the progressive sequence associated with the second progressive award. In this embodiment, the gaming system disclosed herein determines whether to provide one or more of the progressive awards to the player based on that player's skill in both the partial skill-based game and the skill-based progressive award sequence.

The gaming system, gaming device and method disclosed herein thus enables each of one or more players to qualify for at least one progressive award and provide each of one or more players with an opportunity to win the progressive award based on that player's level of skill in: (i) a plurality of plays of a partial skill-based game, (ii) a skill-based progressive award sequence, or (iii) a plurality of plays of a partial skill-based game and a skill-based progressive award sequence. That is, after a player becomes eligible to win one of the plurality of progressive awards (e.g., either based on that player's level of skill in a plurality of plays of a partial skill-based game or independent of that player's level of skill in a plurality of plays of a partial skill-based game), the gaming system, gaming device and method disclosed herein enables that player to win the progressive award that the player is currently eligible to win based on that player's level of skill in a skill-based progressive award sequence associated with that progressive award.

Additional features and advantages are described herein, and will be apparent from the following Detailed Description and the figures.

BRIEF DESCRIPTION OF THE FIGURES

FIG. 5A is a chart showing examples of different progressive awards having different progressive award values, wherein each one of the progressive awards is associated with a different range of points.

FIG. 5B is a chart showing examples of different progressive awards having different progressive award values, wherein each one of the progressive awards is associated with a different range of points.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
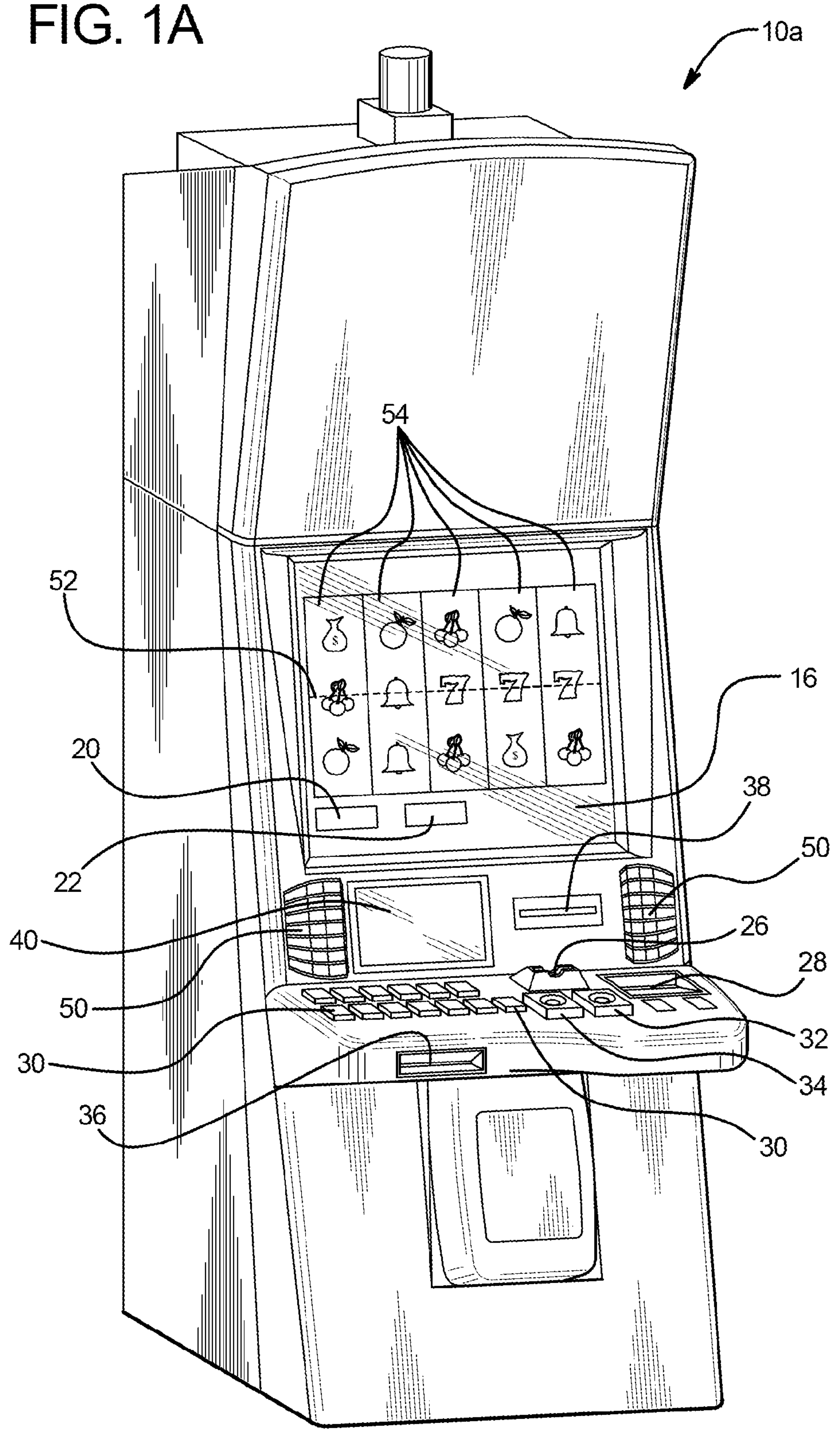
FIGS. 1A and 1B are perspective views of alternative embodiments of one of the gaming devices in the gaming system of the present disclosure.
Figure 1B:
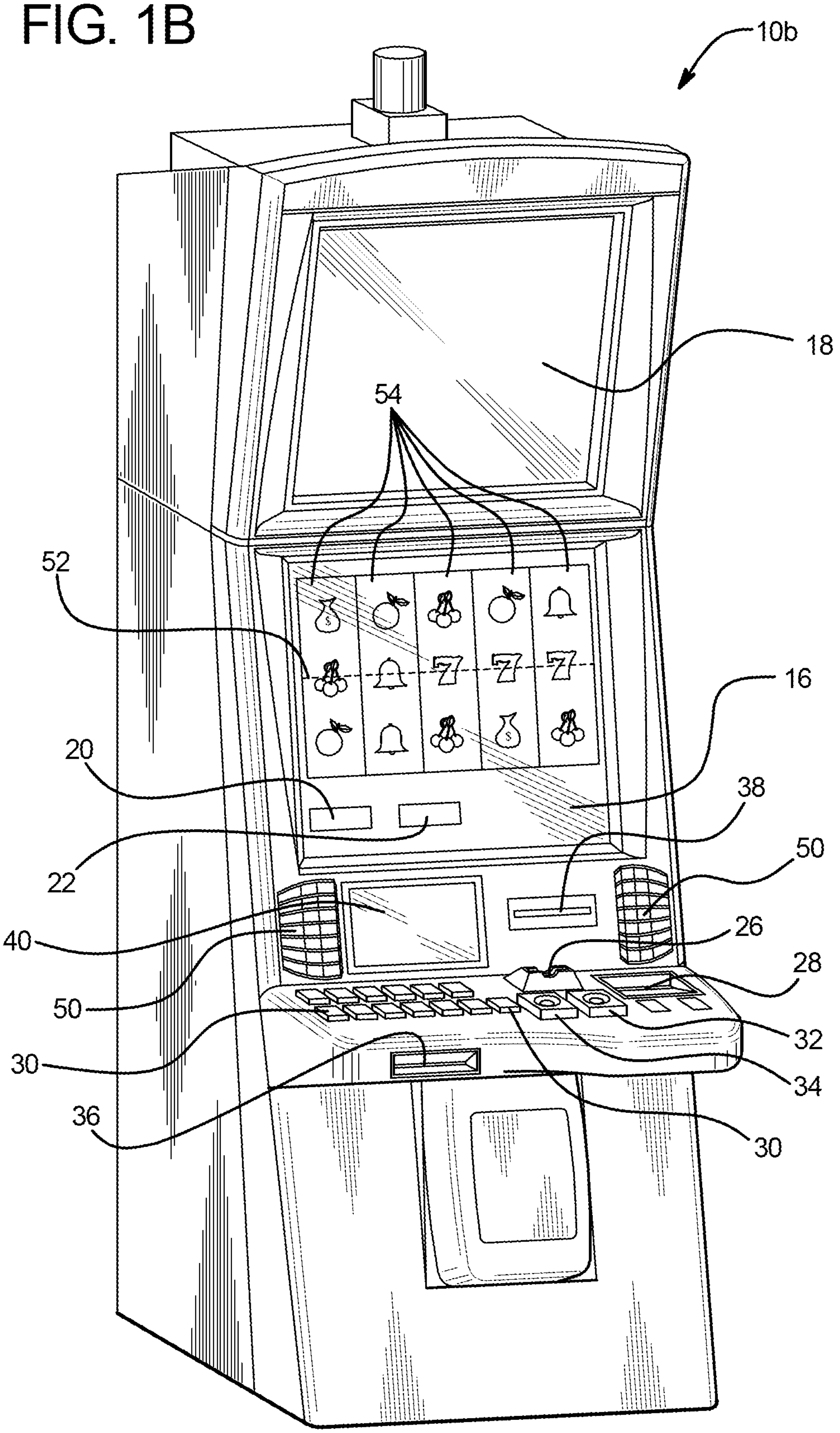

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
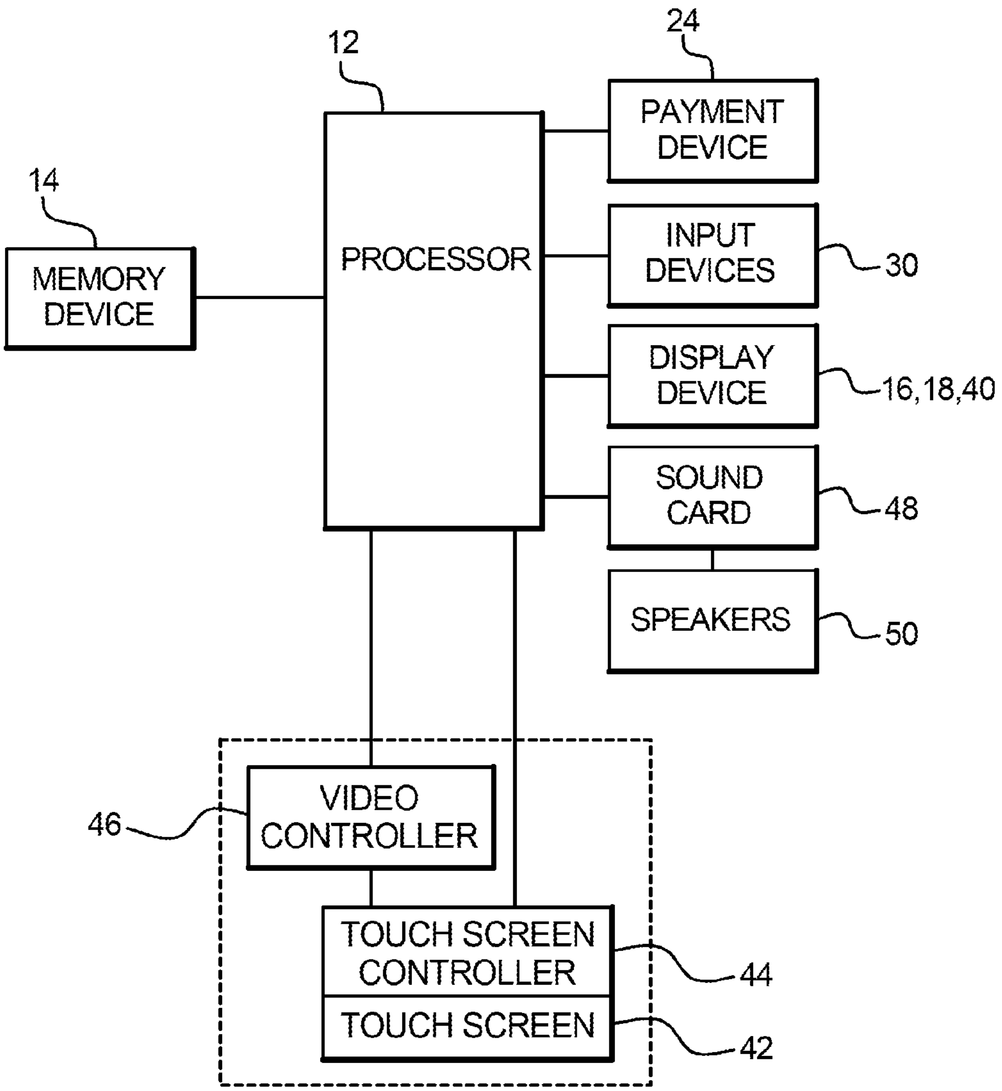
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a hand-held device, such as a personal digital assistant (PDA), a portable computing or mobile device, or another computerized platform to implement the present disclosure. In one embodiment, the gaming device or gaming machine disclosed herein is operable over a wireless network, for example as part of a wireless gaming system. In one such embodiment, the gaming machine may be a hand-held device, a mobile device, or any other suitable wireless device that enables a player to play any suitable game at a variety of different locations. In various embodiments in which the gaming device or gaming machine is a hand-held device, a mobile device, or any other suitable wireless device, at least one memory device and at least one processor which control the game or other operations of the hand-held device, mobile device, or other suitable wireless device may be located: (a) at the hand-held device, mobile device or other suitable wireless device; (b) at a central server or central controller; or (c) any suitable combination of the central server or central controller and the hand-held device, mobile device or other suitable wireless device. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, one input device is a joystick or control pad (not shown). Depending upon the embodiment, the gaming device includes one or more joysticks or control pads to control at least one movement of a character or object in a game environment displayed on the central display device 16 or the upper display device 18. In one embodiment, the joystick or control pad includes one or more buttons, which each perform a designated task depending upon the displayed game environment. For example, if the central display device 16 displays a shooting game environment, the player operates the joystick to control or move a player-controlled aircraft to dodge objects (e.g., such as other aircraft or asteroids) and the player operates any buttons on the joystick to shoot numerous objects (e.g., such as other aircraft or asteroids). In another example, if the upper display device 18 displays a pinball game environment, the player operates the joystick or control pad to put the ball into play (e.g., by operating a plunger) and the player operates any buttons on the joystick or control pad to keep the ball in play (e.g., by operating one or more flippers).

In one embodiment, the input devices, such as the buttons, the joystick or the control pad, enable the player to make zero, one or a plurality of inputs during the play of a game, such as a partial skill-based game. That is, the input devices allow for player interaction with the images displayed in association with the game.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. The primary or base game may also comprise any suitable partial skill-based game, such pinball or an interactive arcade game, as further described below. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
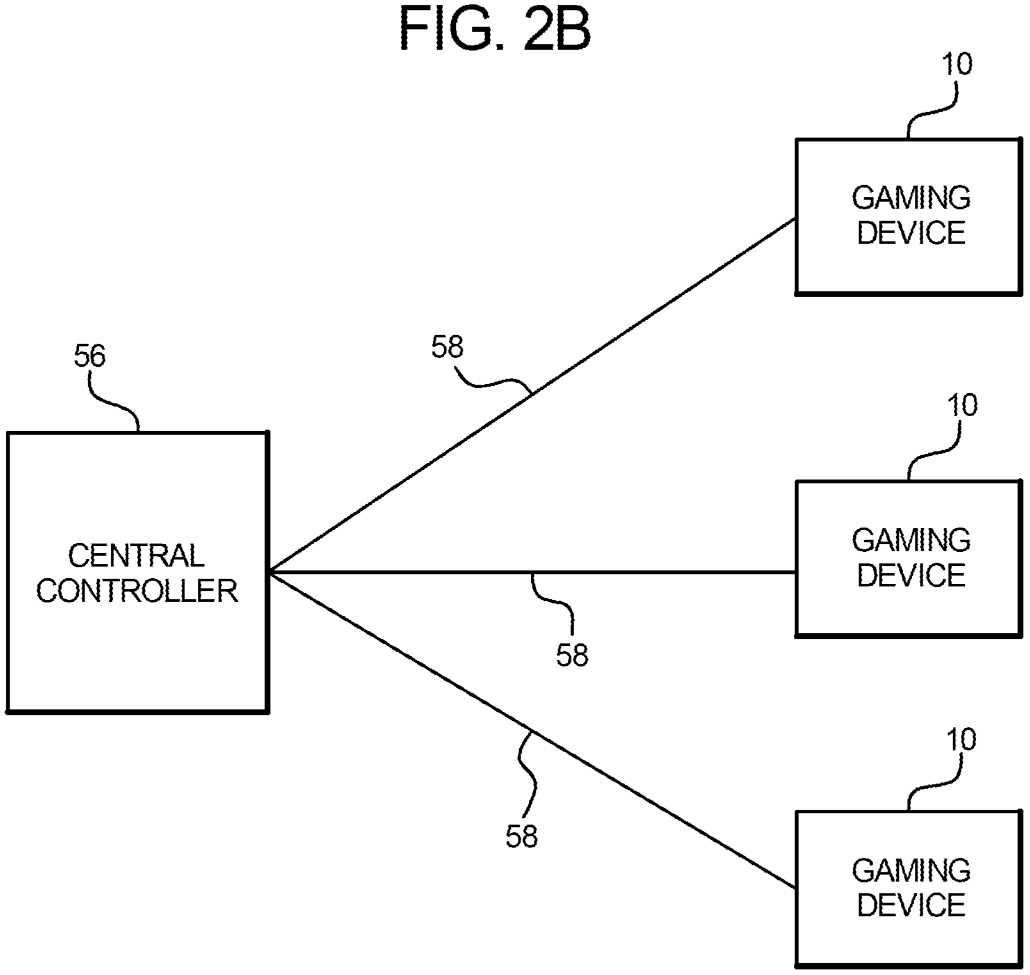
FIG. 2B is a schematic block diagram of one embodiment of a gaming system network configuration including a plurality of gaming devices disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Progressive Awards

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play.

In different embodiments, the progressive award triggering event or qualifying condition occurs based on an amount coin-in during a designated period of time, such as between progressive award triggering events or qualifying conditions. In this embodiment, the gaming system determines if an amount of coin-in wagered at one or more gaming devices in the gaming system reaches or exceeds a designated amount of coin-in (i.e., a threshold coin-in amount) during a designated period of time, such as between progressive award triggering events or qualifying conditions. Upon the amount of coin-in wagered at one or more gaming devices in the gaming system reaching or exceeding the bonus threshold coin-in amount during the designated period of time, the gaming system causes one or more of such events or conditions to occur. In different embodiments, the threshold coin-in amount is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day) or determined based on any other suitable method or criteria.

In different embodiments of the gaming system disclosed herein, a progressive award triggering event or qualifying condition occurs based on an amount coin-out during a designated period of time, such as between progressive award triggering events or qualifying conditions. In this embodiment, the gaming system determines if an amount of coin-out provided by one or more gaming devices in the gaming system reaches or exceeds a designated amount of coin-out (i.e., a threshold coin-out amount) during a designated period of time, such as between progressive award triggering events or qualifying conditions. Upon the amount of coin-out provided at one or more gaming devices in the gaming system reaching or exceeding the threshold coin-out amount during the designated period of time, the gaming system causes one or more of such events or conditions to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day) or determined based on any other suitable method or criteria.

In different embodiments of the gaming system disclosed herein, a progressive award triggering event or qualifying condition occurs based on a predefined variable reaching a defined parameter threshold during a designated period of time, such as between progressive award triggering events or qualifying conditions. For example, when the $500{,}000^{th}$ player has played a gaming machine of the gaming system (ascertained from a player tracking system), one or more of such events or conditions occur. In different embodiments, the predefined parameter thresholds include a designated length of time, a designated length of time after a certain dollar amount is hit, a designated wager level threshold for a specific machine (which gaming device is the first to contribute $250,000), a designated number of gaming machines active, or any other designated parameter that defines a designated suitable threshold.

In different embodiments of the gaming system disclosed herein, a progressive award triggering event or qualifying condition occurs based on a designated amount of elapsed time. In this embodiment, a future point in time is set for when one or more of such events or conditions will occur. In one embodiment, such future time is set based on historical data.

In different embodiments of the gaming system disclosed herein, a progressive award triggering event or qualifying condition occurs based upon one or more gaming system operator defined player eligibility parameters. In one such embodiment, the gaming system operator defines the parameters for eligibility based on any suitable criterion. In one embodiment, such gaming system operator defined player eligibility parameters are stored on a player tracking system (such as via a player tracking card or other suitable manner). In one such embodiment, the central controller/gaming device processor recognizes the player's identification (via the player tracking system) when the player inserts or otherwise associates their player tracking card in the gaming machine. The central server/gaming device processor determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In different embodiments of the gaming system disclosed herein, a progressive award triggering event or qualifying condition occurs based on a system determination, including one or more random selections by the central controller. In one embodiment, as described above, the central controller tracks all active gaming machines and the wagers placed on those machines. Each gaming machine has its own entry defining its state as either active or inactive and also defining the values of the wagers from that gaming machine. In one embodiment, active status means that the gaming machine is being actively played by a player and enrolled/inactive status means that the gaming machine is not being actively played by a player. The active status requirements can be based on any suitable number of satisfied criteria or defined in any suitable manner by the implementer of the gaming system. In one such embodiment, based on the gaming machine's state as well as one or more wager pools associated with the gaming machine, the central controller determines whether one or more of such progressive award triggering events or qualifying conditions will occur. In one such embodiment, the player who consistently places a higher wager is more likely to be associated with an occurrence of one or more of such progressive award triggering events or qualifying conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In different embodiments of the gaming system disclosed herein, a progressive award triggering event or qualifying condition occurs based on a determination of if any numbers allotted to a gaming device match a randomly selected number. In this embodiment, upon or prior to each play of each gaming machine, a gaming device selects a random number from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, one or more of such progressive award triggering events or qualifying conditions occur. It should be appreciated that any suitable manner of causing one or more progressive award triggering events or qualifying conditions to occur may be implemented in accordance with the gaming system and method disclosed herein.

In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, at least two of the progressive awards are associated with different types of triggering events (e.g., triggering events based on coin-in or triggering events based on time). In another embodiment, at least two of the progressive awards are associated with different triggering events (e.g., different coin-in values or time values). In one such embodiment, a first progressive award is associated with a short term triggering event and a second progressive award is associated with a long term triggering event. The short term triggering event occurs more frequently than the long term triggering event. Thus, one or more of the progressive awards may be provided frequently (e.g., such as those with a low value) while another one or more of the progressive awards may be provided infrequently (e.g., such as those with a high value).

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

Partial Skill-Based Progressive Awards

In various embodiments, the gaming system, gaming device and method disclosed herein determines whether to provide at least one of a plurality of progressive awards to the player based on that player's level of skill in: (i) a plurality of plays of a partial skill-based game, (ii) a skill-based or partial skill-based progressive award sequence, or (iii) a plurality of plays of a partial skill-based game and a skill-based (or partial skill-based) progressive award sequence. In one embodiment, the gaming system determines whether to provide the player a quantity of points based, at least in part, on zero, one or more inputs made by the player which tend to measure that player's level of skill in the partial skill-based game. After providing any points to (or otherwise accumulating any points for) the player, the gaming system determines whether to associate at least one of the plurality of progressive awards with the player (i.e., determine if that player is currently eligible to win one of the plurality of progressive awards) based on a total quantity of points accumulated for the player.

In various embodiments, the gaming system, gaming device and method disclosed herein provides a game with at least one skill component and at least one non-skilled component (referred to herein as a partial skill-based game). In one such embodiment, the partial skill-based game includes a skill-component, such as at least one input that determines one or more of when a wager is placed and the amount of that wager in the partial skill-based game. In this embodiment, the partial skill-based game also includes a non-skill component, such as at least one determination of an award, wherein any award is determined based on the determined wager.

In one embodiment, after an occurrence of a progressive award triggering event (i.e., a designated triggering event that is associated with the progressive award that the player is currently eligible to win), the gaming system determines whether to enable the player to play for that progressive award. If the gaming system determines to enable the player to play for the progressive award, the gaming system displays a skill-based progressive award sequence associated with the progressive award. For the progressive award sequence, the gaming system determines whether to provide the progressive award to the player based, at least in part, on zero, one or more inputs made by the player which tend to measure that player's level of skill in the skill-based progressive award sequence.

In one embodiment, the gaming system determines: (i) whether or not the player is eligible to win (or otherwise associated with) at least one of the plurality of progressive awards based on the points the player is provided as a result of the player's measured skill in the partial skill-based game, (ii) whether or not to display a progressive award sequence associated with the progressive award that the player is currently eligible, and (iii) whether or not to provide the progressive award to that player based on the player's measured skill in the skill-based progressive award sequence.

Figure 3:
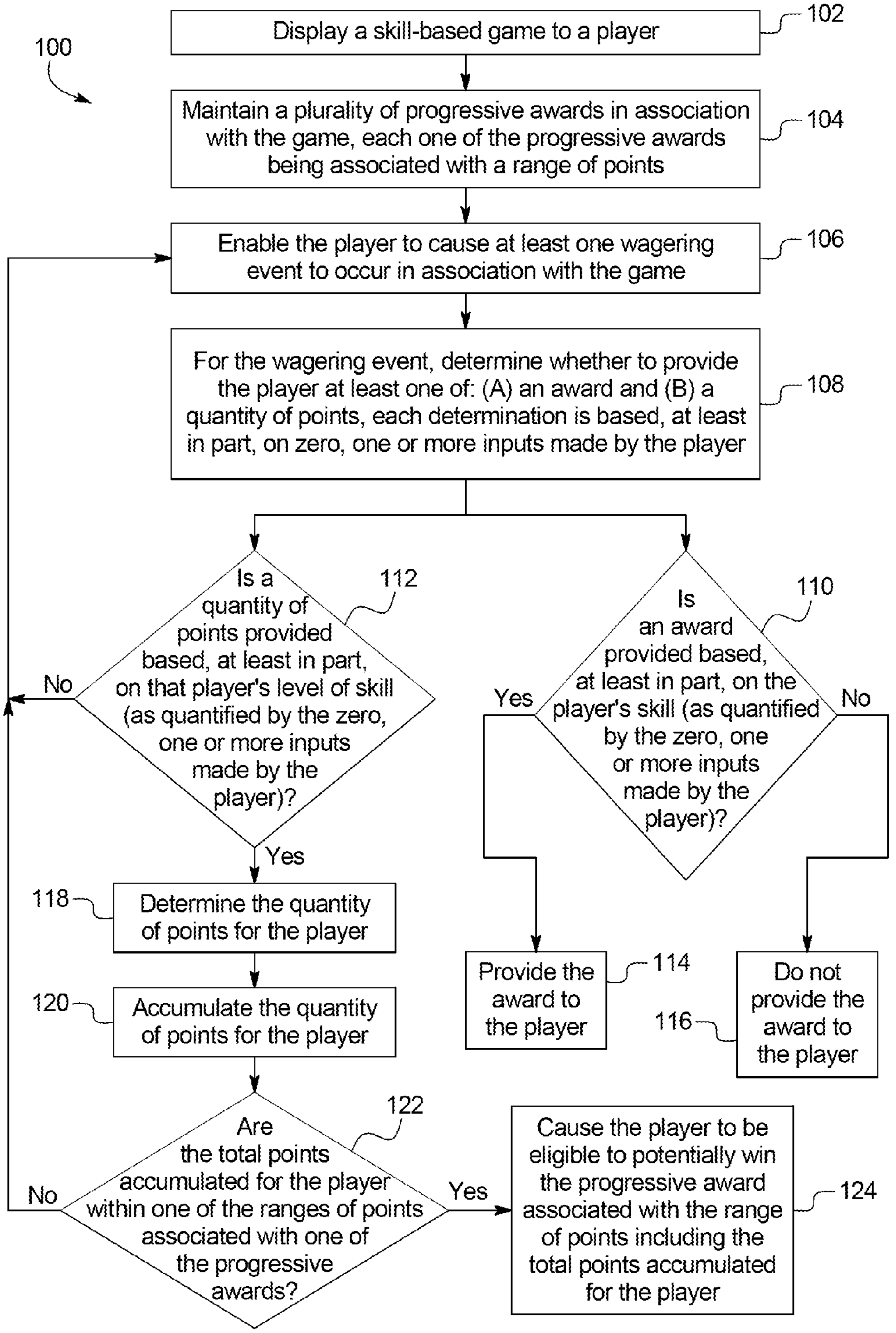
FIG. 3 is a process flow diagram showing one possible flow sequence of one embodiment of the present disclosure.

Referring now to FIG. 3, a flowchart of an example process 100 for operating a gaming system or a gaming device disclosed herein is illustrated. In one embodiment, this process 100 is embodied in one or more software programs stored in one or more memories and executed by one or more processors or controllers. Although this process 100 is described with reference to the flowchart illustrated in FIG. 3, it should be appreciated that many other methods of performing the acts associated with this process may be used. For example, the order of certain of the blocks described may be changed, or certain of the blocks described may be optional.

In the embodiment illustrated in FIG. 3, the gaming system causes at least one display device of one of the gaming machines in the gaming system to display a partial skill-based game to a player as indicated in block 102. In different embodiments, the partial skill-based game includes, but is not limited to, an action game, a shooter game, a first person shooter game, an action-adventure game, a construction and management simulation game, a life simulation game, a role playing game, a multiplayer role playing game, a strategy game, a vehicle simulation game, a music game, a party game, a puzzle game, a sports game, a board game, a card game, a word game, a Mahjong game, a 3-in-a-row game, a hidden object game, an educational game, an arcade-style game, a pinball game, a trivia game, a domino game and/or any other suitable type of game. It should be appreciated that for purposes of this application, skill includes: (i) physical skill, such as, but not limited to: timing, aim, physical strength or any combination thereof which is quantifiable by zero, one or more inputs made by the player in association with the partial skill-based game; (ii) mental skill (i.e., knowledge, reasoning, and/or strategy) which is quantifiable by zero, one or more inputs made by the player in association with the partial skill-based game; and (iii) any other type of skill which is quantifiable by zero, one or more inputs made by the player in association with the partial skill-based game.

In one embodiment, the gaming system (or the progressive gaming system host site computer described above) maintains a plurality of progressive awards in association with the partial skill-based game as indicated in block 104. For example, as illustrated in FIGS. 5A and 5B, the gaming system maintains a first progressive award (e.g., progressive award A) having a first value (e.g., $57.54), a second, different progressive award (e.g., progressive award B) having a second, different value (e.g., $4,845.41), and a third, different progressive award (e.g., progressive award C) having a third, different value (e.g., $13,281.97).

In one embodiment, for each one of the maintained progressive awards, the gaming system associates a range of points (or a range of score levels) with that progressive award. In the embodiment illustrated in FIG. 5A, the gaming system associates the first progressive award with a first range of points (e.g., zero points to one-thousand points), the second progressive award with a second range of points (e.g., one-thousand-one points to three-thousand points), and the third progressive award with a third range of points (e.g., greater than three-thousand points). It should be appreciated that because the gaming system associated the first progressive award with the first range of points which includes zero points, the gaming system enables each player who plays the partial skill-based game at one of the gaming machines in the gaming system to become eligible to win (or otherwise qualify to play for) the first progressive award.

In the embodiment illustrated in FIG. 5B, the gaming system associates the first progressive award with a first range of points (e.g., five-hundred points to one-thousand points), the second progressive award with a second range of points (e.g., one-thousand-one points to three-thousand points), and the third progressive award with a third range of points (e.g., greater than three-thousand points). It should be appreciated that because the gaming system associated the first progressive award with the first range of points which begins at five-hundred points, the gaming system causes each player who plays the partial skill-based game at one of the gaming machines in the gaming system to accumulate five-hundred points before becoming eligible to win (or otherwise qualify to play for) the first progressive award.

In one embodiment, the gaming system (or the progressive gaming system host site computer described above) maintains the plurality of progressive awards in a multi-level progressive award configuration ("MLP"). In one such embodiment, the MLP includes a plurality of progressive award levels and for each one of the progressive award levels of the MLP, the gaming system (or the progressive gaming system host site computer described above) associates one or more of the maintained progressive awards with that progressive award level of the MLP. In one embodiment, for each one of the progressive award levels of the MLP, the gaming system (or the progressive gaming system host site computer described above) associates a separate eligibility condition, such as a different range of points, with that progressive award level. For example, a first progressive award level of the MLP is associated with a first range of points (or score level) and a second, different progressive award level of the MLP is associated with a second, different range of points (or score level). In another embodiment, one or more ranges of points (or score levels) overlap for one or more progressive award levels. For example, a first progressive award level of the MLP is associated with a first range of points (or score level) and a second, different progressive award level of the MLP is associated with a second, range of points (or score level) that at least partially overlaps the first range of points (or score level).

After associating the maintained progressive awards with the ranges of points (or score levels), the gaming system enables the player to initiate a play of the partial skill-based game displayed by one of the gaming machines in the gaming system. In one embodiment, the gaming system enables the player to initiate the play of the partial skill-based game by placing a wager at the gaming machine. In another embodiment, the gaming system enables the player to initiate the play of the partial skill-based game by purchasing a contract to repeatedly play the partial skill-based game for a designated amount of time (in exchange for a designated amount of money as described in greater detail below). In another embodiment, the gaming system enables the player to initiate the play of the partial skill-based game by funding at least one wager component (which the gaming system automatically wagers on behalf of the player in association with the partial skill-based game as described in greater detail below).

After initiating the play of the partial skill-based game, the gaming system enables the player to cause at least one wagering event to occur in association with the game as indicated in block 106 of FIG. 3. In one such embodiment, as the player plays the partial skill-based game, the gaming system determines whether the player causes at least one of a plurality of wagering events to occur during the play of the partial skill-based game, and for each occurrence of one of the wagering events, the gaming system causes at least one wager to be placed for the partial skill-based game.

In one embodiment, the gaming system allocates a portion of each wager placed for the partial skill-based game to one or more of the progressive awards maintained in association with the partial skill-based game. The maintained progressive awards grow in value as more players play the partial skill-based games at the gaming machines in the gaming system and more portions of these players' wagers are allocated to the maintained progressive awards. It should be appreciated that the gaming system can allocate a portion of each wager placed for the partial skill-based game at one or more of the gaming devices to one or more of the progressive awards. It should further be appreciated that the gaming system can allocate the same or different portions of each wager to one or more of the progressive awards.

After the occurrence of the wagering event, the gaming system determines whether to provide the player an award (e.g., such as a partial skill-based game award), a quantity of points, or both for the wagering event as indicated in block 108 of FIG. 3. In the embodiment illustrated in FIG. 3, this determination is based, at least in part, on zero, one or more inputs made by the player which tend to measure that player's level of skill in the partial skill-based game. For example, in a shooting game in which the player makes zero, one or more inputs to control an aircraft while attempting to shoot other aircraft or objects (e.g., asteroids), each shot taken by the player-controlled aircraft, or each collision of the player-controlled aircraft with another aircraft or object, could constitute a wagering event. For the wagering event, the gaming system determines whether the player's shot (or the player-controlled aircraft) hits a designated target (e.g., another aircraft or object). That is, the gaming system determines whether to provide the player an award, a quantity of points, or both based on the result of zero, one or more inputs made by the player (e.g., the player's shot or movement of the player-controlled aircraft). If the player's shot hits the designated target (or the player-controlled aircraft collides with the designated target), the player's inputs quantify (or tend to measure) that player's skill in the partial skill-based game, and the gaming system determines to provide the player an award, a quantity of points, or both for hitting or destroying the designated target.

As illustrated in FIG. 3, the gaming system individually determines whether to provide the player at least one of: (i) an award, and (ii) a quantity of points, wherein each determination is based, at least in part, on zero, one or more inputs made by the player in the partial skill-based game. In this embodiment, the gaming system makes two independent determinations: (i) the gaming system determines whether to provide the player an award based, at least in part, on the player's skill (as based on or quantified by zero, one or more inputs made by the player) in the partial skill-based game as indicated in block 110, and (ii) the gaming system determines whether to provide the player a quantity of points based, at least in part, on the player's skill (as based on or quantified by zero, one or more inputs made by the player) in the partial skill-based game as indicated in block 112. Though the gaming system makes two independent determinations in this embodiment, it should be appreciated that the gaming system can provide the player with an award in addition to a quantity of points for a single wagering event.

For the award determination indicated in block 110, if the gaming system determines to provide the player with an award based on that player's skill in the partial skill-based game, the gaming system provides the determined award to the player as indicated by block 114. Similarly, if the gaming system determines not to provide the player with an award based on that player's skill in the partial skill-based game, the gaming system does not provide the determined award to the player as indicated by block 116. That is, the gaming system determines whether or not to provide the player with an award based on zero, one or more inputs made by the player which tend to measure one or more aspects of that player's skill in the partial skill-based game.

In different embodiments, the partial skill-based game award includes any suitable award such as a value, a credit, a free spin, a free game, a multiplier, a non-progressive award, a progressive award, an award opportunity, an incrementing value for another award (e.g., progressive award) or any other suitable award as desired by the game implementer.

For the point determination indicated in block 112, if the gaming system determines not to provide the player with a quantity of points based on the player's skill in the partial skill-based game, the gaming system enables the player to continue playing the partial skill-based game and further enables that player to cause another wagering event in association with the partial skill-based game as described above and indicated in block 106. However, if the gaming system determines to provide the player with a quantity of points based on the player's skill in the partial skill-based game, the gaming system determines the quantity of points to provide (or otherwise accumulate for) the player as indicated in block 118. That is, the gaming system determines whether or not to provide the player with a quantity of points based on zero, one or more inputs made by the player which tend to measure one or more aspects of that player's skill in the partial skill-based game.

In one embodiment, the gaming system determines the quantity of points to provide the player based on the wagering event which occurred in association with the partial skill-based game. In one embodiment, the gaming system accumulates different quantities of points for the player based on different skill-based events which occur during the play of the partial skill-based game. For example, if a first skill-based event occurs during the play of the partial skill-based game in response to a first input made by the player, the gaming system determines to provide the player with a first quantity of points (e.g., fifty points), and if a second skill-based event occurs during the play of the partial skill-based game in response to a second, different input made by the player, the gaming system determines to provide the player with a second, different quantity of points (e.g., one-hundred points). It should be appreciated that for purposes of this application, the skill-based events of the partial skill based game includes: (i) physical skill, such as, but not limited to: timing, aim, physical strength or any combination thereof which is quantifiable by zero, one or more inputs made by the player in association with the skill-based game; (ii) mental skill (i.e., knowledge, reasoning, and/or strategy) which is quantifiable by zero, one or more inputs made by the player in association with the skill-based game; and (iii) any other type of skill which is quantifiable by zero, one or more inputs made by the player in association with the skill-based game.

After the gaming system determines a quantity of points to provide to the player, the gaming system accumulates the quantity of points for the player as indicated in block 120. In one embodiment, the gaming system maintains a point account associated with each player playing at one of the gaming machines in the gaming system. For each player, the gaming system determines whether to increment the point account based on any points accumulated for that player. In one embodiment, the quantity of points provided to (or otherwise accumulated for) the player's point account form that player's score. For example, if the gaming system provides the player fifty points during the play of the game which when combined with any previously accumulated points (e.g., one-thousand-five-hundred points), then the gaming system forms a score of one-thousand-five-hundred-fifty points for the player. That is, in one embodiment, the wagering event constitutes a skill-based point accumulation event which enables the player to accumulate a quantity of points based on that player's skill (as quantified by zero, one or more inputs made by the player) in the partial skill-based game.

After accumulating any points for the player, the gaming system determines whether the total amount of points accumulated for the player are within one of the ranges of points associated with one of the progressive awards as indicated by block 122 of FIG. 3. That is, the gaming system compares the total amount of points accumulated for the player (i.e., the player's score) to each of the ranges of points (e.g., score levels) associated with the maintained plurality of progressive awards. The gaming system determines whether the player's score falls within one of the ranges of points associated with one of the plurality of progressive awards.

If the gaming system determines that the player's score falls outside one of the ranges of points, the gaming system enables the player to continue playing the partial skill-based game and enables that player to cause another wagering event in association with the partial skill-based game as indicated in block 106. However, if the gaming system determines that the player's score falls within one of the ranges of points, the gaming system causes the player to be eligible to potentially win the progressive award associated with the range of points including the total points accumulated for the player (i.e., the player's score) as indicated in block 124 of FIG. 3. For example, if the total amount of points accumulated for the player (i.e., the player's score) equals one-thousand points, and the gaming system associates a first progressive award with a first range of points (e.g., zero points to one-thousand points) and a second progressive award with a second range of points (e.g., one-thousand-one points to three-thousand points), the gaming system causes the player to be eligible to potentially win the first progressive award. That is, in this embodiment, the player's score determines which of the progressive awards, if any, the player is eligible to play for and potentially win after an occurrence a designated progressive award triggering event.

In one embodiment, the gaming system enables a plurality of players to be eligible for one or more of the maintained progressive awards based, at least in part, on each player's measured level of skill (as based on or quantified by zero, one or more inputs made by that player) in the partial skill-based game. In one such embodiment, based on each player's score (i.e., the total quantity of points accumulated for that player), the gaming system determines whether each individual player is eligible to potentially win one of the plurality of progressive awards. That is, in one such embodiment, the gaming system determines whether each individual player is eligible to potentially win one of the plurality of progressive awards based on zero, one or more inputs made by such players (i.e., which result in each player's score, or the total quantity of points accumulated for that player).

Figure 4:
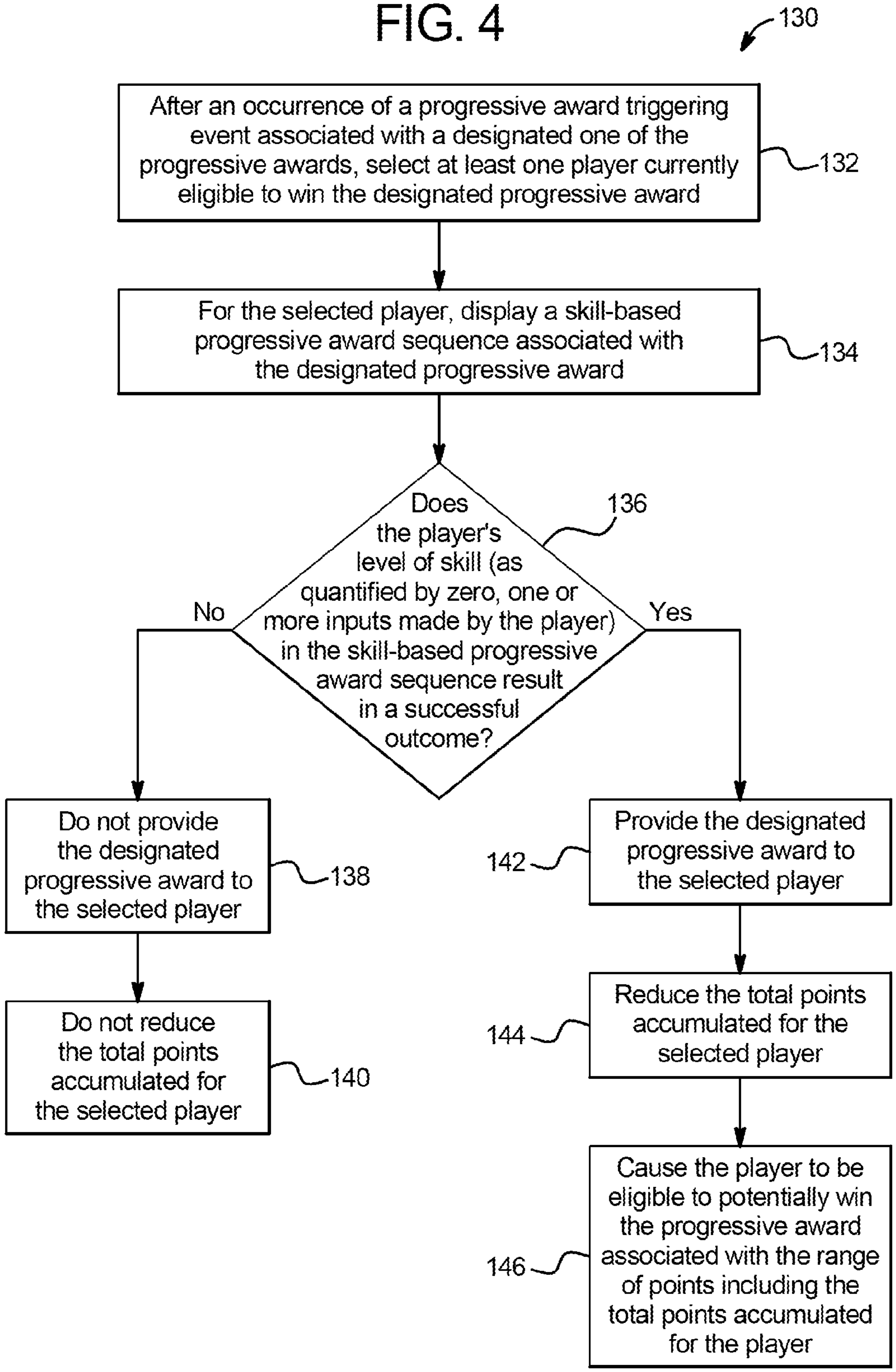
FIG. 4 is a process flow diagram showing one possible flow sequence of one embodiment of the present disclosure.

Referring now to FIG. 4, a flowchart of an example process 130 for operating a gaming system or a gaming device disclosed herein is illustrated. In one embodiment, this process 130 is embodied in one or more software programs stored in one or more memories and executed by one or more processors or controllers. Although this process 130 is described with reference to the flowchart illustrated in FIG. 4, it should be appreciated that many other methods of performing the acts associated with this process may be used. For example, the order of certain of the blocks described may be changed, or certain of the blocks described may be optional.

In the embodiment illustrated in FIG. 4, the gaming system determines whether to provide one of the progressive awards to one or more players of the gaming machines in the gaming system. In one embodiment, each one of the progressive awards is associated with a designated progressive award triggering event as described above. The gaming system determines whether a progressive award triggering event associated with one of the progressive awards occurs, and after one of the designated progressive award triggering events occur, the gaming system determines which one or more of the players is eligible to play for the progressive award associated with that designated progressive award triggering event.

After an occurrence of a progressive award triggering event associated with a designated one of the progressive awards, the gaming system selects at least one player that is currently eligible to potentially win the designated progressive award as indicated in block 132. That is, the gaming system selects one or more of the players currently eligible to win the triggered progressive award based on that player's score or those players' scores. In different embodiments, the selection is predetermined, randomly determined, determined based on the player's status (such as determined through a player tracking system), determined based on a skill-based event in association with the partial skill-based game, determined based on zero, one or more inputs made by the player in association with the partial skill-based game, determined based on a random determination by the central controller, determined based on a random determination at the gaming machine, randomly determined based on the player's score (i.e., the points accumulated for the player), determined based on one or more side wagers placed, determined based on the player's wager for a play of the partial skill-based game, determined based on time (such as the time of day) or determined based on any other suitable method or criteria.

After selecting one of the players, the gaming system causes a skill-based progressive award sequence associated with the designated progressive award to be displayed to the selected player as indicated in block 134. It should be appreciated that for purposes of this application, skill for the skill-based progressive award sequence (or partial skill-based progressive award sequence) includes: (i) physical skill, such as, but not limited to: timing, aim, physical strength or any combination thereof which is quantifiable by zero, one or more inputs made by the player in association with the skill-based game; (ii) mental skill (i.e., knowledge, reasoning, and/or strategy) which is quantifiable by zero, one or more inputs made by the player in association with the skill-based game; and (iii) any other type of skill which is quantifiable by zero, one or more inputs made by the player in association with the skill-based game.

After displaying the skill-based progressive award sequence, the gaming system enables the selected player to play the skill-based progressive award sequence. The gaming system determines whether the selected player's skill (as quantified by zero, one or more inputs made by the player) in the skill-based progressive award sequence results in a successful outcome as indicated in block 136. If the gaming system determines that the player's skill in the skill-based progressive award sequence does not result in a successful outcome (e.g., the skill-based progressive award sequence results in an unsuccessful outcome), the gaming system does not provide the designated progressive award to the player as indicated in block 138. In one embodiment, the gaming system enables the player to maintain their score (e.g., the number of points accumulated in the partial skill-based game) after an unsuccessful outcome in the skill-based progressive award sequence as indicated in block 140. In another embodiment, the gaming system reduces the player's score as a result of the unsuccessful outcome in the skill-based progressive award sequence.

If the gaming system determines that the player's skill (as quantified by zero, one or more inputs made by the player) in the skill-based progressive award sequence results in a successful outcome, the gaming system provides the designated progressive award to the player as indicated in block 142. In one embodiment, the gaming system reduces the player's score as a result of the successful outcome in the skill-based progressive award sequence as indicated in block 144. In another embodiment, the gaming system enables the player to maintain their score (e.g., the number of points accumulated in the partial skill-based game) after a successful outcome in the skill-based progressive award sequence.

After reducing or maintaining the player's score as a result of the successful outcome in the skill-based progressive award sequence, the gaming system determines whether the player's score falls within one of the ranges of points associated with one of the progressive awards. If the gaming system determines that the player's score falls within one of the ranges of points, the gaming system causes the player to be eligible to potentially win the progressive award associated with the range of points including the total points accumulated for the player (i.e., the player's score) as indicated in block 146 of FIG. 4. For example, if the total amount of points accumulated for the selected player (i.e., the player's score)

equals one-thousand-five-hundred points, the gaming system reduces the selected player's score as a result of the successful outcome in the skill-based progressive award sequence (e.g., from one-thousand-five-hundred points to five-hundred points). Continuing with this example, if the gaming system associates a first progressive award with a first range of points (e.g., zero points to one-thousand points) and a second progressive award with a second range of points (e.g., one-thousand-one points to three-thousand points), the gaming system associates another one of the progressive awards (e.g., the first progressive award instead of the second progressive award) with the selected player based on that player's reduced score (e.g., five-hundred points). That is, in this example, the gaming system enables the selected player to become eligible to win another one of the progressive awards (e.g., the first progressive award instead of the second progressive award) based on that player's reduced score (e.g., five-hundred points).

In another embodiment, the progressive award triggering event occurs in association with a play of a game at one of the gaming devices in the gaming system. In one such embodiment, once the player becomes eligible for one or more of the progressive awards, the gaming system polls a random number generator at the moment each wagering event occurs (i.e., when each wager component is placed) to randomly determine whether or not to provide the progressive award to the player. In another such embodiment, once the player becomes eligible for one or more of the progressive awards, the gaming system polls a random number generator for each unit of time that passes to randomly determine whether or not to provide the progressive award to the player.

In another embodiment, when a gaming system level progressive award triggering event occurs, the gaming system triggers a multi-player skill-based (or partial skill-based) competition for all gaming devices eligible for the progressive award. In this embodiment, the gaming system distributes the progressive award to one or more of the players participating in the multi-player skill-based (or partial skill-based) competition.

It should be appreciated that the gaming system can select a plurality of players who are eligible to win the designated progressive award and display the skill-based progressive award sequence associated with that progressive award to the plurality of players. In one such embodiment, the gaming system simultaneously displays, or substantially simultaneously displays, the progressive award sequence to the plurality of players at different gaming machines in the gaming system and provides the designated progressive award to the first player who obtains a successful outcome in the skill-based progressive award sequence.

In one embodiment, the gaming system splits the designated progressive award between two or more players who obtain a successful outcome in the skill-based progressive award sequence. In one embodiment, the gaming system splits the designated progressive award equally between two or more players who obtain a successful outcome in the skill-based progressive award sequence. In another embodiment, the gaming system splits the designated progressive award unequally between two or more players who obtain a successful outcome in the skill-based progressive award sequence. For example, the gaming system provides a first player with a first share (or percentage) of the designated progressive award and provides a second player with a second, different share (or percentage) of the designated progressive award. In different embodiments, the share of the designated progressive award provided to each player who obtains a successful outcome in the skill-based progressive award sequence is predetermined, randomly determined, determined based on that player's status (such as determined through a player tracking system), determined based on a skill-based event in association with the partial skill-based game, determined based on zero, one or more inputs made by the player in association with the partial skill-based game, determined based on a random determination by the central controller, determined based on a random determination at the gaming machine, determined based on the player's score (i.e., the points accumulated for the player), determined based on one or more side wagers placed, determined based on that player's wager for a play of the partial skill-based game, determined based on time (such as the time of day) or determined based on any other suitable method or criteria.

In one embodiment, if two or more players obtain a successful outcome in the skill-based progressive award sequence, the gaming system provides the designated progressive award at its current value to a first one of the players and provides the designated progressive award at its initial value (or its reset value) to a second one of the players. For example, if one of the progressive awards maintained by the gaming system increments to $57.54 from an initial value of $50.00, the gaming system provides a first player the designated progressive award valued at $57.54 and provides a second player the designated progressive award after that progressive award is reset to its initial value of $50.00.

In another embodiment, after the gaming system provides a progressive award to a player, the gaming system resets the progressive award to a reset value. In one embodiment, to account for funding the progressive award reset for different players of different levels of skill (i.e., how to fund the progressive award reset for highly-skilled players who frequently achieve a score high enough to be eligible for the progressive award such that the progressive award is frequently provided), the gaming system amortizes the progressive award reset over the different events that award points. For example, for a progressive award that resets at 1,000 credits and requires a score of 10,000+ points for eligibility, every event that provides points awards 1/10 of a credit per point. That 1/10 of a credit goes directly to fund the reset amount for the progressive award. In this example, if a player does not win the progressive award, or is not eligible for the progressive award, the gaming system reconciles the 1 point value by adding credits to the progressive award increment after the game is over. That way, the progressive award reset is fully funded when the progressive award is won, and the progressive award increment is increased when the progressive award is not won. Such an embodiment provides for appropriate progressive award funding regardless of player skill.

In one embodiment, the player's score is ranked relative to other players' scores in a ranking hierarchy, such as a leader board or a scoreboard. In another embodiment, the player's score is compared against other players' scores to determine a high score for the partial skill-based game. In such embodiments, the gaming system provides the player a bonus award, such as a credit value, a point value, a multiplier or modifier, a coupon or voucher redeemable for a good or service, a physical reward (e.g., a watch or car), or any other suitable bonus award in association with the partial skill-based game based on the leader board and/or the high score.

Figure 6:
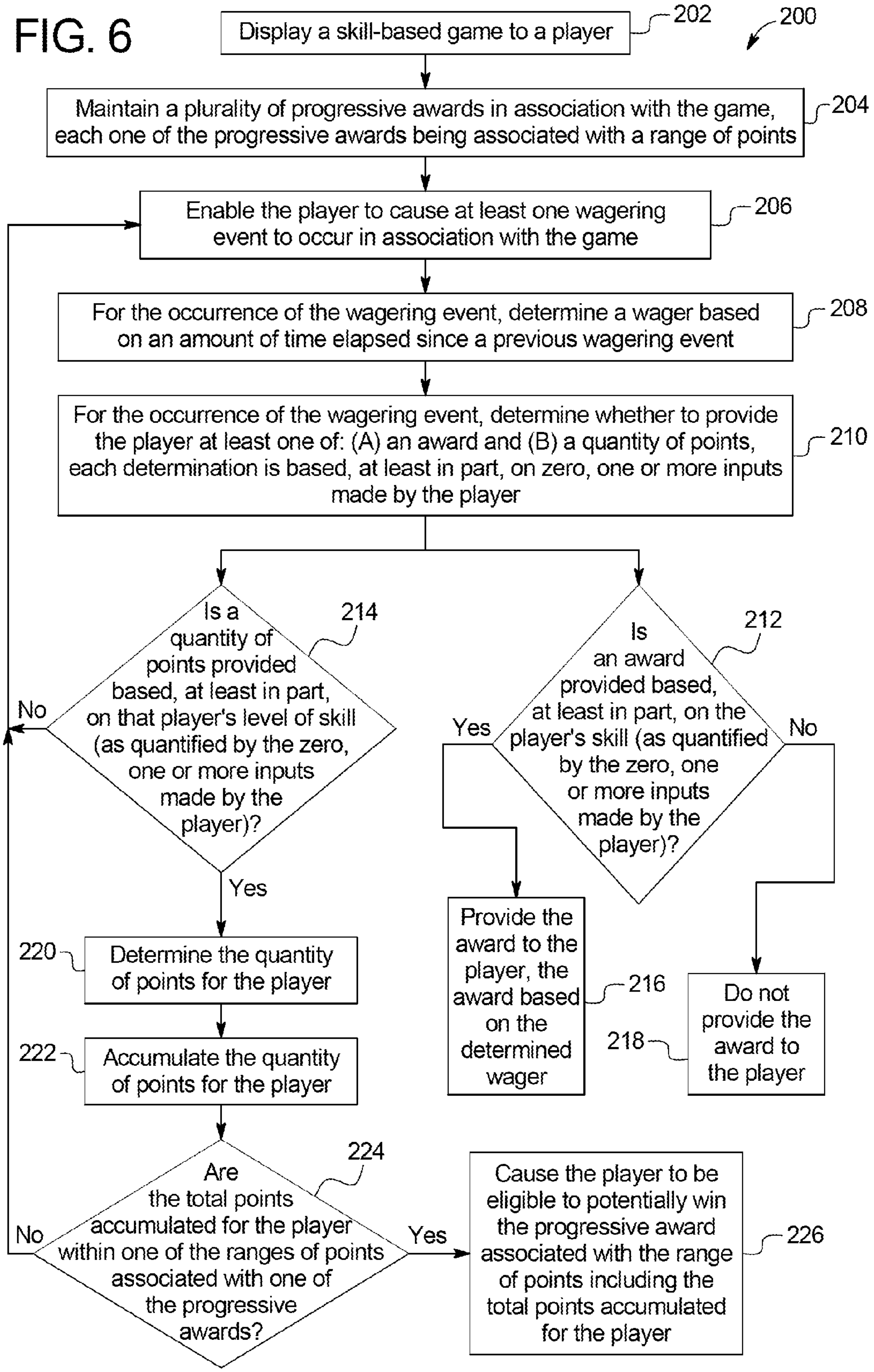
FIG. 6 is a process flow diagram showing one possible flow sequence of one embodiment of the present disclosure.
Figure 7:
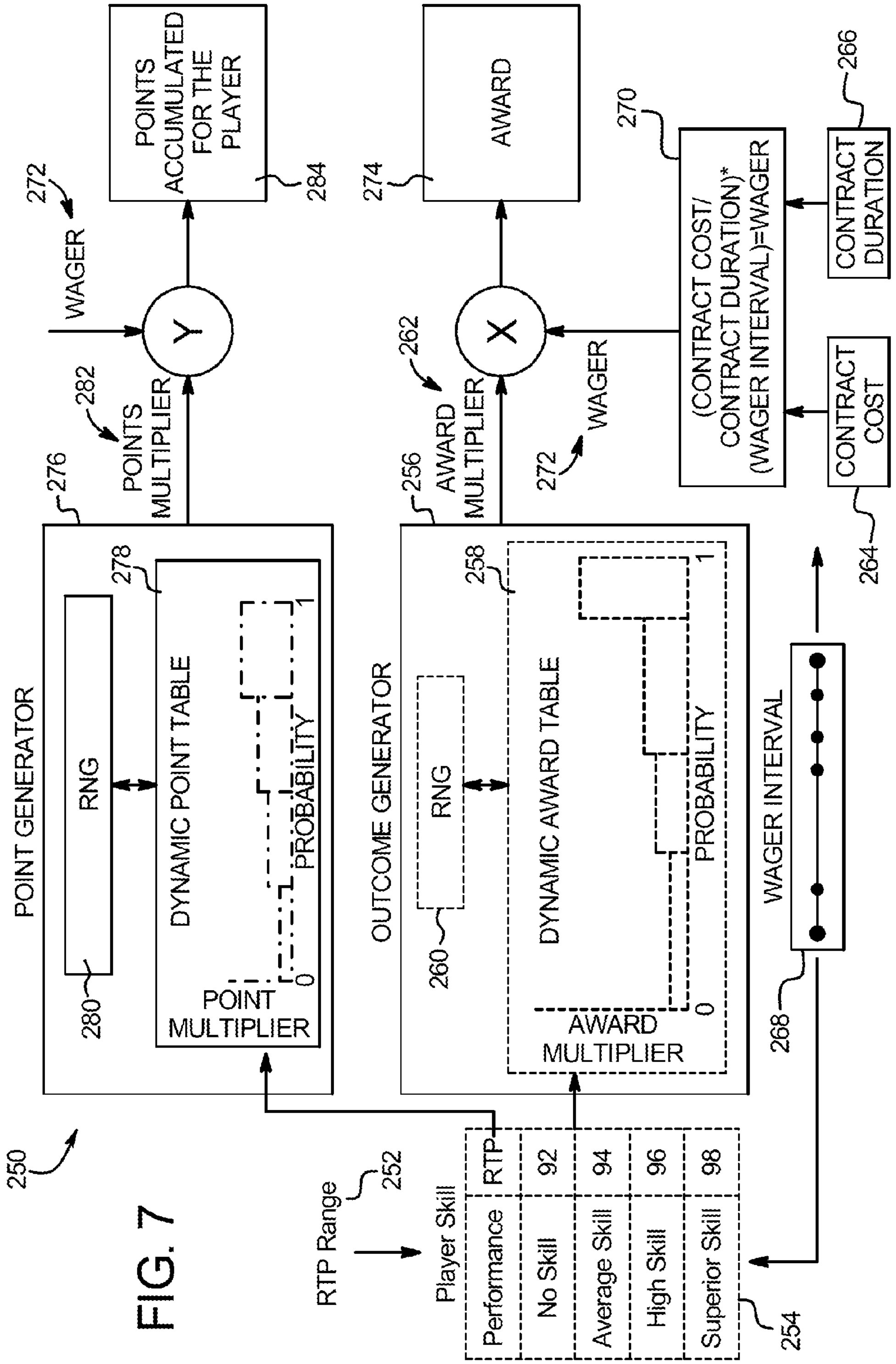
FIG. 7 is a schematic diagram showing one embodiment of the present disclosure in accordance with FIG. 6.

Referring now to FIGS. 6 and 7, the gaming system, in one embodiment, enables the player to purchase a contract to repeatedly or continually play the partial skill-based game for a designated amount of time in exchange for a designated wager amount. In this embodiment, the designated wager amount paid by the player funds one or more wagers determined after one or more wagering events which occur in association with one or more plays of the partial skill-based game.

In one embodiment, the partial skill-based game includes a plurality of game elements and the gaming system enables the player to interact with the plurality of game elements in the partial skill-based game. In one such embodiment, each interaction with one of the plurality of the game elements constitutes a wagering event. In one embodiment, the wagering event includes at least one of: (i) an award generating event, and (ii) a point generating event. The gaming system measures a level of skill of the player in interacting with the game elements (as based on or quantified by zero, one or more inputs made by the player in the partial skill-based game) and determines an award, an amount of points or both to provide the player for each successful interaction with the game elements. In one embodiment, the gaming system determines the award, the quantity of points or both provided to the player based on zero, one or more inputs made by the player in the partial skill-based game (i.e., which tend to measure that player's level of skill in the partial skill-based game), a random determination, and a time elapsed since a last successful interaction with any one of the game elements.

FIG. 6 illustrates a flowchart of an example process 200 for operating a gaming system or a gaming device disclosed herein. In one embodiment, this process 200 is embodied in one or more software programs stored in one or more memories and executed by one or more processors or controllers. Although this process 200 is described with reference to the flowchart illustrated in FIG. 6, it should be appreciated that many other methods of performing the acts associated with this process may be used. For example, the order of certain of the blocks described may be changed, or certain of the blocks described may be optional.

In the embodiment illustrated in FIG. 6, the gaming system causes at least one display device of one of the gaming machines in the gaming system to display a partial skill-based game to a player as indicated in block 202 (and described above with reference to block 102 of FIG. 3). The gaming system (or the progressive gaming system host site computer described above) maintains a plurality of progressive awards in association with the partial skill-based game as indicated in block 204 (and described above with reference to block 104 of FIG. 3).

The gaming system enables the player to initiate a play of the partial skill-based game displayed by one of the gaming machines in the gaming system. In one embodiment, the gaming system enables the player to initiate the play of the partial skill-based game by purchasing a contract to play the partial skill-based game for a designated amount of time (in exchange for a designated amount of money). In one embodiment, the partial skill-based game includes a plurality of game elements and the gaming system enables the player to interact with the plurality of game elements, such as by making zero, one or more inputs, in the partial skill-based game. In one such embodiment, each interaction with one of the plurality of the game elements constitutes a wagering event. That is, based on the player's interactions with the plurality of game elements in the partial skill-based game, the gaming system enables the player to cause at least one wagering event to occur in association with the game as indicated in block 206 of FIG. 6.

For the occurrence of the wagering event, the gaming system determines a wager (e.g., an amount of a wager) based on an amount of time elapsed since a previous wagering event as indicated in block 208. That is, the gaming system tracks the occurrence of each wagering event and determines the amount of time that elapses between consecutive wagering events. Based on the amount of time that elapses between consecutive wagering events, the gaming system determines the wager as indicated in block 208.

After the occurrence of the wagering event, the gaming system determines whether to provide the player an award (e.g., a partial skill-based game award), a quantity of points, or both for the wagering event as indicated in block 210. In the embodiment illustrated in FIG. 6, this determination is based, at least in part, on zero, one or more inputs made by the player which tend to measure that player's level of skill in the partial skill-based game. In one embodiment, the wagering event includes at least one of: (i) an award generating event, and (ii) a point generating event. In one embodiment, the gaming system accumulates different quantities of points for the player based on different skill-based events (e.g., award generating events, point generating events or both) which occur during the play of the partial skill-based game (e.g., interactions with game elements of the partial skill-based game resulting from zero, one or more inputs made by the player in the partial skill-based game). It should be appreciated that for purposes of this application, the skill-based events or interactions involve one or more aspects of physical skill, mental skill (e.g., knowledge and/or strategy), or any other type of skill. That is, the gaming system measures a level of skill of the player in interacting with the game elements (as based on or quantified by zero, one or more inputs made by the player) in the partial skill-based game and determines an award, an amount of points or both to provide the player for each different successful interaction with the game elements resulting from the player's inputs in the partial skill-based game.

The gaming system determines whether the wagering event includes one of a plurality of award generating events as indicated in block 212. As indicated in block 212, the gaming system determines whether to provide the player with an award based on that player's skill (as based on or quantified by zero, one or more inputs made by the player) in the partial skill-based game. If the gaming system determines to provide the player with an award based on that player's measured skill in the partial skill-based game, the gaming system provides the determined award to the player as indicated in block 216. In one embodiment, the determined award is based on the determined wager as indicated in block 208. In another embodiment, the determined award is based on zero, one or more inputs made by the player which tend to measure the player's level of skill in the partial skill-based game. In different embodiments, the determined award is based on at least one of: an input made by the player, a random determination, a time elapsed since a last successful interaction with any one of the game elements, and a time elapsed before a first successful interaction with any one of the game elements. However, if the gaming system determines not to provide the player with an award based on that player's skill in the partial skill-based game, the gaming system does not provide the determined award to the player as indicated by block 218.

The gaming system also determines whether the wagering event includes one of a plurality of point generating events as indicated in block 214. As indicated in block 214, the gaming system determines whether to provide the player with a quantity of points based on that player's skill (as based on or quantified by zero, one or more inputs made by the player) in the partial skill-based game. If the gaming system determines not to provide the player with a quantity of points based on the player's skill in the partial skill-based game, the gaming system enables the player to continue playing the partial skill-based game and enables that player to cause another wagering event in association with the partial skill-based game as described above and indicated in block 206. However, if the gaming system determines to provide the player with a quantity of points based on the player's skill in the partial skill-based game, the gaming system determines the quantity of points to provide (or otherwise accumulate for) the player as indicated in block 220. In one embodiment, the gaming system determines the quantity of points to provide the player based on the determined wager as indicated in block 208. In another embodiment, the gaming system determines the quantity of points to provide the player based on the zero, one or more inputs made by the player which tend to measure that player's level of skill measured in the partial skill-based game, a random determination, a time elapsed since a last successful interaction with any one of the game elements, and the wager determined as indicated in block 208.

After the gaming system determines a quantity of points to provide to the player, the gaming system accumulates the determined quantity of points for the player as indicated in block 222. As described above, the gaming system maintains a point account associated with each player playing at one of the gaming machines in the gaming system and determines whether to increment the point account for each player based on any points accumulated for that player.

After accumulating any points for the player, the gaming system determines whether the total amount of points accumulated for the player are within one of the ranges of points associated with one of the progressive awards as indicated by block 224 of FIG. 6 (and as described above with reference to block 122 of FIG. 3). That is, the gaming system compares the total amount of points accumulated for the player (i.e., the player's score) to each of the ranges of points (e.g., score levels) associated with the maintained progressive awards. The gaming system determines whether the player's score falls within one of the ranges of points associated with one of the progressive awards.

If the gaming system determines that the player's score falls outside one of the ranges of points, the gaming system enables the player to continue playing the partial skill-based game and enables that player to cause another wagering event in association with the partial skill-based game as indicated in block 206. However, if the gaming system determines that the player's score falls within one of the ranges of points, the gaming system causes the player to be eligible to potentially win the progressive award associated with the range of points including the total points accumulated for the player (i.e., the player's score) as indicated in block 226 of FIG. 6 (and as described above with reference to block 124 of FIG. 3).

In different embodiments, the determination whether or not the gaming system associates one or more of the progressive awards with one of the players is predetermined, randomly determined, determined based on a player's status (such as determined through a player tracking system), determined based on zero, one or more inputs made by the player in the partial skill-based game, determined based on a generated symbol or symbol combination, determined based on a quantity of points accumulated for the player, determined based on a quantity of points associated with at least one of the progressive awards, determined based on a random determination by the central controller, determined based on a random determination at the gaming machine, determined based on one or more side wagers placed, determined based on the player's primary game wager, determined based on time (such as the time of day) or determined based on any other suitable method or criteria.

In one embodiment, the gaming system randomly determines which one of the progressive awards, if any, at least one of the players of the partial skill-based game will become eligible to win. That is, in one such embodiment, the gaming system randomly determines which progressive award(s), if any, to associate with one or more of the players of the partial skill-based game. It should be appreciated that such random determination enables the gaming system to accommodate lower skilled players by enabling such players to become eligible to win certain progressive awards which the players would not otherwise qualify to win based on those players' total points accumulated (i.e., each player's score).

In one embodiment, the gaming system randomly determines which one of the players becomes eligible to win a designated one of the progressive awards during the skill-based progressive-award sequence. That is, in one such embodiment, the gaming system randomly determines which player(s) of the partial skill-based game, if any, will become eligible to win the designated progressive award independent of the total points accumulated for that player (i.e., that player's score).

FIG. 7 illustrates a schematic diagram 250 showing one embodiment of the gaming system determining the wager for the partial skill-based game, any award provided to the player, and any amount of points accumulated for the player in accordance with the present disclosure. In the embodiment illustrated in FIG. 7, the gaming system associates an average payback percentage range 252 (i.e., a return to player or RTP range) with the partial skill-based game. The gaming system also associates a separate average payback percentage from the payback percentage range 252 with one of a plurality of different measures or levels 254 of the player's skill in the partial skill-based game. In one embodiment, the gaming system grades or measures a player's level of skill in the partial skill-based game based on how that player interacts with the game elements of the partial skill-based game (e.g., performs certain tasks in association with the partial skill-based game). Based on the player's graded or measured level of skill in the partial skill-based game, the gaming system assigns one of the average payback percentages to the partial skill-based game for that player.

For example, in a partial skill-based game having an average payback percentage range of 92% to 98%, a player exhibiting no or minimal skill may cause the partial skill-based game to payout at the game's minimum 92% average payback percentage, while a player exhibiting superior skill may cause the game to payout at the game's maximum 98% average payback percentage. It should be appreciated that while the gaming system assigns a lower average payback percentage to lower-skilled players in this model, those lower-skilled players still have an opportunity to win one of the progressive awards maintained by the gaming system due to the randomly determined award multiplier 262 and the randomly determined points multiplier 282 described in greater detail below.

In one embodiment, the gaming system assigns an average payback percentage to the partial skill-based game for each player until the gaming system grades or measures that player's level of skill in the partial skill-based game. That is, the gaming system assigns the average payback percentage (e.g., 94%) to the partial skill-based game being played by a player who has not yet been graded or measured by the gaming system. In one embodiment, the gaming system stores or tracks the graded or measured level of skill for each of one or more players in one or more partial skill-based games. In one such embodiment, the gaming system (or a suitable player tracking system) utilizes the player's player tracking card, or player tracking system to store or track the graded or measured level of skill for that player in one or more partial skill-based games.

After the gaming system determines the payback percentage for the partial skill-based game, the gaming system sends the payback percentage information to an outcome generator 256. In one embodiment, for each interaction with one of the game elements in response to zero, one or more inputs made by the player in the partial skill-based game, the outcome generator 256 determines whether to provide the player with an award 274 as a result of that interaction. In one embodiment, the gaming system determines a random number (as determined by a suitable random number generator 260) to determine whether to provide the player with the award 274. The gaming system references a dynamic award table 258 to associate a separate probability of occurrence with a plurality of the game elements of the partial skill-based game. That is, whenever the player encounters, collides or otherwise interacts with those game elements in response to zero, one or more inputs made by the player (e.g., when the player's aircraft shoots at a target, which is one example of a game element, or the player's pinball hits a bumper, which is another example of a game element), the gaming system references the dynamic award table 258 associated with that game element (i.e., the game element which the player has interacted with in response to zero, one or more inputs made by that player in association with the partial skill-based game) to determine an award multiplier 262.

In one embodiment, the gaming system compares the randomly generated number (as determined by a suitable random number generator 260) to the probability of occurrence for the game element interacted with by the player in accordance with the dynamic award table 258, and based on this comparison, determines the award multiplier 262. For example, the random number generator 260 generates a random number between 0 and 1 and the gaming system utilizes that randomly generated number as a reference or index into the dynamic award table 258 to determine the award multiplier 262.

As shown in FIG. 7, the gaming system associates the widest range with the lowest award multiplier, with progressively narrower ranges being associated with progressively higher award multipliers. For example, if the gaming system associates the game element with a high probability of occurrence, the outcome generator 256 will generate a low award multiplier 262 based on the dynamic award table 258. If the gaming system associates the first game element with a low probability of occurrence, the gaming system will generate a high award multiplier 262 based on the dynamic award table 258. It should be appreciated that the dynamic award tables 258 for the game elements can be configured with as little or as much variability (e.g., the difference between the lowest award multiplier and the highest award multiplier) as desired by the gaming system implementer. In one embodiment, the gaming system multiplies the award multiplier 262 by the determined wager 272 to determine the award 274 to be provided to the player.

After the gaming system determines the payback percentage for the partial skill-based game, the gaming system also sends the payback percentage information to a point generator 276. In one embodiment, for each interaction with one of the game elements, the point generator 276 determines whether to provide the player with a quantity of points 284 as a result of that interaction. In one embodiment, the gaming system determines a random number (as determined by a suitable random number generator 280) to determine whether to provide the player with the quantity of points 284. The gaming system references a dynamic point table 278 to associate a separate probability of occurrence with a plurality of the game elements of the partial skill-based game. That is, whenever the player encounters, collides or otherwise interacts with those game elements in response to zero, one or more inputs made by the player (e.g., when the player's aircraft shoots at a target, which is one example of a game element, or the player's pinball hits a bumper, which is another example of a game element), the gaming system references the dynamic point table 278 associated with that game element (i.e., the game element which the player has interacted with in response to zero, one or more inputs made by that player in association with the partial skill-based game) to determine a points multiplier 282.

In one embodiment, the gaming system compares the randomly generated number (as determined by a suitable random number generator 280) to the probability of occurrence for the game element interacted with by the player in accordance with the dynamic point table 278, and based on this comparison, determines the point multiplier 282. For example, the random number generator 280 generates a random number between 0 and 1 and the gaming system utilizes that randomly generated number as a reference or index into the dynamic point table 278 to determine the point multiplier 282.

As shown in FIG. 7, the gaming system associates the widest range with the lowest award multiplier, with progressively narrower ranges being associated with progressively higher award multipliers. For example, if the gaming system associates the first game element with a high probability of occurrence, the point generator 276 will generate a low point multiplier 282 based on the dynamic point table 278. If the gaming system associates the first game element with a low probability of occurrence, the gaming system will generate a high point multiplier 282 based on the dynamic point table 278. It should be appreciated that the dynamic point tables 278 for the game elements can be configured with as little or as much variability (e.g., the difference between the lowest award multiplier and the highest award multiplier) as desired by the gaming system implementer. In one embodiment, the gaming system multiplies the point multiplier 282 by the determined wager 272 to determine the quantity of points 284 provided to (or otherwise accumulated for) the player. As described above, the gaming system accumulates any points provided to the player as that player's score (i.e., which tends to measure that player's skill as a result of zero, one or more inputs made by that player in the partial skill-based game).

In another embodiment (not shown), the number of points provided for successfully shooting a target is static. This embodiment provides players with confidence in the fairness of the game by keeping the award of points consistent. In one such embodiment, to reward players that choose a greater bet increment (as described below) or a greater contract cost to time ratio (as also described below) with more points, the gaming system includes a points multiplier.

In one embodiment, as seen in FIG. 7, for each interaction with one of the game elements, the gaming system determines a wager 272 for the partial skill-based game based on a wager interval 268. In one embodiment, the gaming system determines the wager interval 268 based on one of: (i) an amount of time elapsed since a last successful interaction with any one of the game elements, and (ii) an amount of time elapsed since a beginning of the contract (i.e., a starting point or starting time). For example, a player initiates a play of the partial skill-based game by purchasing a time-based contract. In one embodiment, each second of that contract has a value that is expressed by dividing the contract cost 264 by the contract duration 266. For example, a 60 second contract that costs $6.00 has a contract value of 10 cents per second. In one embodiment, the gaming system determines the wager 272 based on the determined value of time within the contract and the wager interval 268 (i.e., the determined wager 272=(contract cost 264/contract duration 266)*wager interval 268).

In one embodiment, if no previous interaction occurred with one of the game elements (e.g., no previous wagering event has occurred), the gaming system determines the wager interval 268 based on an amount of time elapsed from the starting point of the contract. That is, the gaming system determines the wager 272 by multiplying the value of time within the contract by how much time has elapsed since a starting point of the contract (i.e., the determined wager 272=(contract cost 264/contract duration 266)*wager interval 268). For example, for a 60 second contract costing $6.00, if a first interaction with one of the game elements occurs five seconds after the starting time of the contract, the gaming system determines the wager interval 268 to be five seconds. In this example, the determined wager 272 equals $0.50 (i.e., $0.50=($6.00/60 seconds)*5 seconds).

In one embodiment, if a previous interaction occurred with one of the game elements (e.g., a previous wagering event has occurred), the gaming system determines the wager interval 268 based an amount of time elapsed from the occurrence of the previous interaction (or previous wagering event). That is, the gaming system determines the wager 272 by multiplying the value of time within the contract by how much time has elapsed since the last occurrence of a wagering event (i.e., the determined wager 272=(contract cost 264/contract duration 266)*wager interval 268). For example, for a 60 second contract costing $6.00, if a second interaction with one of the game elements occurs ten seconds after a first interaction with one of the game elements, the gaming system determines the wager interval 268 to be ten seconds. In this example, the determined wager 272 equals $1.00 (i.e., $1.00=($6.00/60 seconds)*10 seconds).

In one embodiment, the gaming system divides the total wager (i.e., the contract cost 264 placed to play the partial skill-based game for the contract duration 266) into a plurality of wagers (or wager components) 272 which the gaming system causes to be wagered after each different interaction with one of the game elements. In one such embodiment, if the player causes less frequent interactions with one of the game elements (i.e., a long or high wager interval 268), the gaming system causes higher wagers (or wager components) 272 to be wagered after each interaction. If the player causes more frequent interactions with one of the game elements (i.e., a short or low wager interval 268), the gaming system causes lower wagers (or wager components) 272 to be wagered after each interaction. It should be appreciated that, in one such embodiment, the player causes each interaction with one of the game elements by making zero, one or more inputs in the partial skill-based game.

In one embodiment, for each interaction caused by the player with one of the game elements in the partial skill-based game, the gaming system determines the wager (or wager components) 272, any award 274 resulting from that interaction (wherein the award 274 is based on the award multiplier 262 as determined by the outcome generator 256) and any quantity of points 284 resulting from that interaction (wherein the quantity of points 284 is based on the point multiplier 282 as determined by the point generator 276).

In one embodiment, as the player plays the partial skill-based game, the time remaining in the contract (i.e., the contract duration 266) approaches zero. As the time remaining in the contract approaches zero, the gaming system causes higher wagers (or wager components) 272 to be wagered after each interaction with one of the game elements so that when the time remaining in the contract is zero, the gaming system has caused the contract cost 264 (represented by a plurality of the wagers or wager components 272) to be wagered. In another embodiment, as the time remaining in the contract approaches zero, the wager interval 268 lengthens (e.g., the time between successful interactions with one of the game elements), which causes the gaming system to cause higher wagers (or wager components) to be wagered after each interaction with one of the game elements.

It should be appreciated that certain portions of the method and gaming system described in FIGS. 6 and 7 are further described in co-pending U.S. Published Patent Application Numbers 2009/0061991; 2009/0061997; 2009/0061998 and 2009/0061999 which were each filed on Apr. 25, 2008.

Referring now to FIGS. 8 to 13, the gaming system displays a progressive award eligibility display area 300 on the upper display device 18 and displays a partial skill-based game 310, such as a pinball game, on the central display device 16. As illustrated, the pinball game 310 includes a plunger 312, a ball 314, a plurality of flippers 316, 318, a plurality of bumpers 320, 322 and a plurality of rails 324, 326. In the pinball game 310, a player places the ball 314 into play on a playfield with the plunger 312 and attempts to win awards, score points or both by causing the ball 314 to contact the bumpers 320, 322 or the rails 324, 326 with the flippers 316, 318. In one embodiment, the pinball game 310 awards points to the player based on an amount of time which the ball 314 is kept in play on the playfield.

Figure 8:
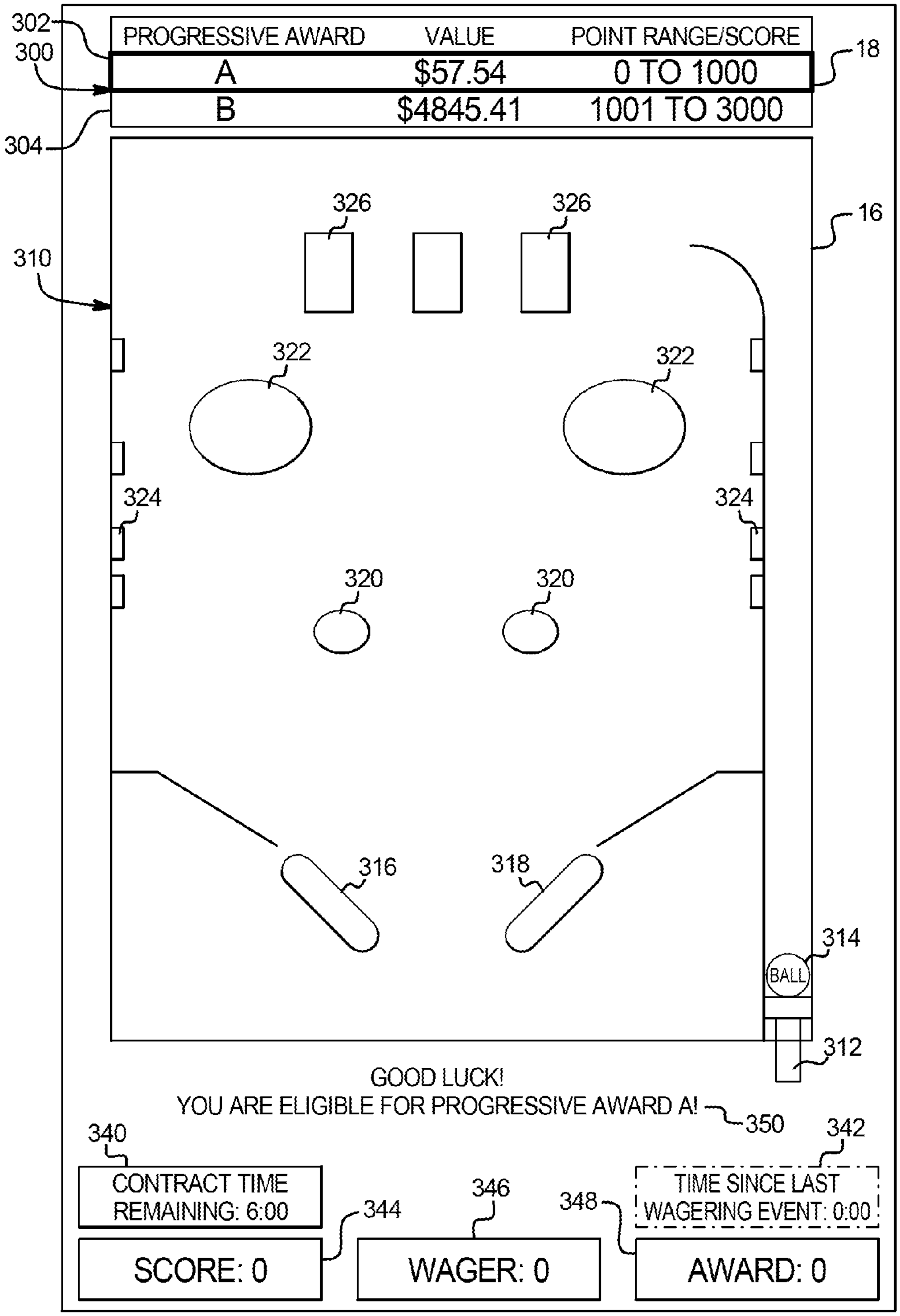
FIG. 8 is an enlarged front plan view of a display device of the gaming device disclosed herein, which illustrates an example of one embodiment of the present disclosure in accordance with FIG. 6.

In one embodiment, the progressive award eligibility display area 300 shows separate display areas 302, 304 associated with respective first and second progressive awards. In this embodiment, the progressive awards correspond to the progressive awards described above with reference to chart 160 of FIG. 5A. Display area 302 shows a first progressive award (e.g., progressive award A) associated with a current value (e.g., $57.54) and a point range or score level (e.g., zero points to one-thousand points). Display area 304 shows a second progressive award (e.g., progressive award B) associated with a current value (e.g., $4,845.41) and a point range or score level (e.g., one-thousand-one points to three-thousand points). The progressive award eligibility display area 300 indicates which one of the first and second progressive awards, if any, the player is currently eligible to potentially win based on that player's score through audio, visual or audio/visual indications (e.g., highlighting, illumination, or sound). As illustrated in FIG. 8, the player is currently eligible for the first progressive award shown by display area 302 because the first progressive award is associated with the range of points that includes zero points, which is the total points accumulated for the player at this point of the pinball game 310 (as indicated by score display 344).

In one embodiment, the gaming system enables the player to initiate the skill-based pinball game 310. In the embodiment illustrated in FIG. 8, the player has purchased a six-minute contract to play the skill-based pinball game 310 for three dollars and sixty cents. Contract time remaining display 340 displays the time remaining for the contract. Wagering event display 342 indicates an amount of time elapsed since a previous wagering event occurred in association with the skill-based pinball game 310. It should be appreciated that wagering event display 342 indicates one of: (i) an amount of time elapsed from the starting point of the contract if no previous interaction occurred with one of the game elements (e.g., no previous wagering event has occurred), and (ii) an amount of time elapsed from the occurrence of a previous interaction if such previous interaction occurred with one of the game elements (e.g., a previous wagering event has occurred).

Score display 344 indicates any points provided to (or otherwise accumulated for) the player based on the player's skill in the partial skill-based game. Award display 348 indicates a total award provided to the player based on the player's skill in the partial skill-based game for the duration of the contract.

Wager display 346 indicates that the player has not placed a wager. It should be appreciated that in this embodiment, the wager display 346 displays an amount of each wager placed during the skill-based pinball game 310 after the occurrence of a designated wagering event. In another embodiment, the wager display 346 displays the contract price paid by the player to initiate the contract, and decrements the contract price by each wager placed during the skill-based pinball game 310 after the occurrence of a designated wagering event.

Message area 350 indicates appropriate messages or instructions such as "GOOD LUCK!" and "YOU ARE ELIGIBLE FOR PROGRESSIVE AWARD A!" to the player visually, or through suitable audio or audiovisual displays. The gaming system causes the message area 350 to display messages or instructions which inform the player about certain aspects of the skill-based pinball game 310.

During the skill-based pinball game 310, the gaming system determines whether one or more wagering events occur. In different embodiments, a wagering event for the skill-based pinball game 310 includes an event that causes the ball 314 to be placed into play on a playfield (e.g., by using the plunger 312), causing the ball 314 to contact one of the bumpers 320, 322, causing the ball to contact one of the rails 324, 326, causing the ball to contact a ramp, causing the ball to follow a designated path, such as an orbit, causing the ball to contact one of the flippers 316, 318, and any other suitable event in association with the skill-based pinball game 310, such as any traditional pinball scoring events.

Figure 9:
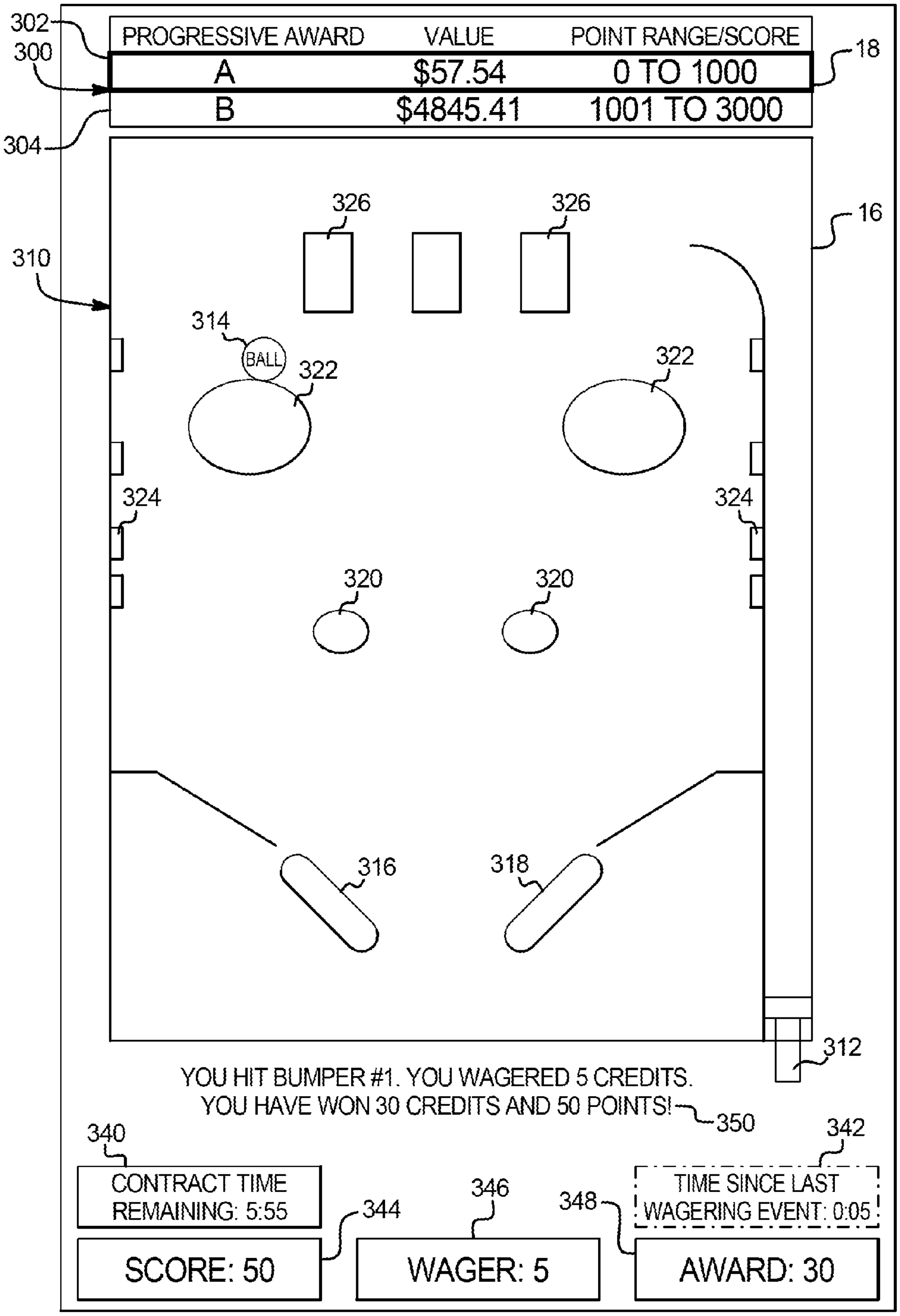
FIG. 9 is an enlarged front plan view of a display device of the gaming device disclosed herein, which illustrates an example of one embodiment of the present disclosure in accordance with FIG. 6.

Referring now to FIG. 9, the player has caused the ball 314 to contact one of the bumpers 322. In this embodiment, the ball 314 contacting the bumper 322 constitutes a first wagering event. For the occurrence of the first wagering event, the gaming system causes a wager to be placed on the pinball game 310.

As described above, each second of the player's contract to play the skill-based pinball game 310 has a value that is expressed by dividing the contract cost by the contract duration. In this embodiment, the six minute contract cost the player three dollars and sixty cents and thus, the contract has a value of one cent per second (or $3.60 contract cost/360 seconds=$0.01 per second). Wager event display 342 indicates that five seconds have elapsed since a previous wagering event (or in this case, since the skill-based pinball game was initiated). Because the contract has a value of one cent per second and that five seconds have elapsed since the previous wagering event, the gaming system determines the wager to be five credits. Wager display 346 indicates that the player wagered five credits as a result of the player causing the ball 314 to contact the bumper 322.

After the occurrence of the wagering event, the gaming system also determines whether to award the player an award and/or a quantity of points based, at least in part, on the player's skill. In the embodiment illustrated in FIG. 9, the player, through a level of skill in the pinball game 310, has caused the ball 314 to hit the bumper 322. In this embodiment, hitting the bumper 322 results in the gaming system providing the player with thirty credits as indicated by the award display 348 and fifty points as indicated by the score display 344. It should be appreciated that the gaming system can provide an award, a quantity of points or both based on the difficulty of the event or the amount of player skill required for a successful outcome. For example, an easy task or event provides the player with a small award (or small amount of points) as compared to a difficult task or event which provides the player with a large award (or a large amount of points).

Figure 10:
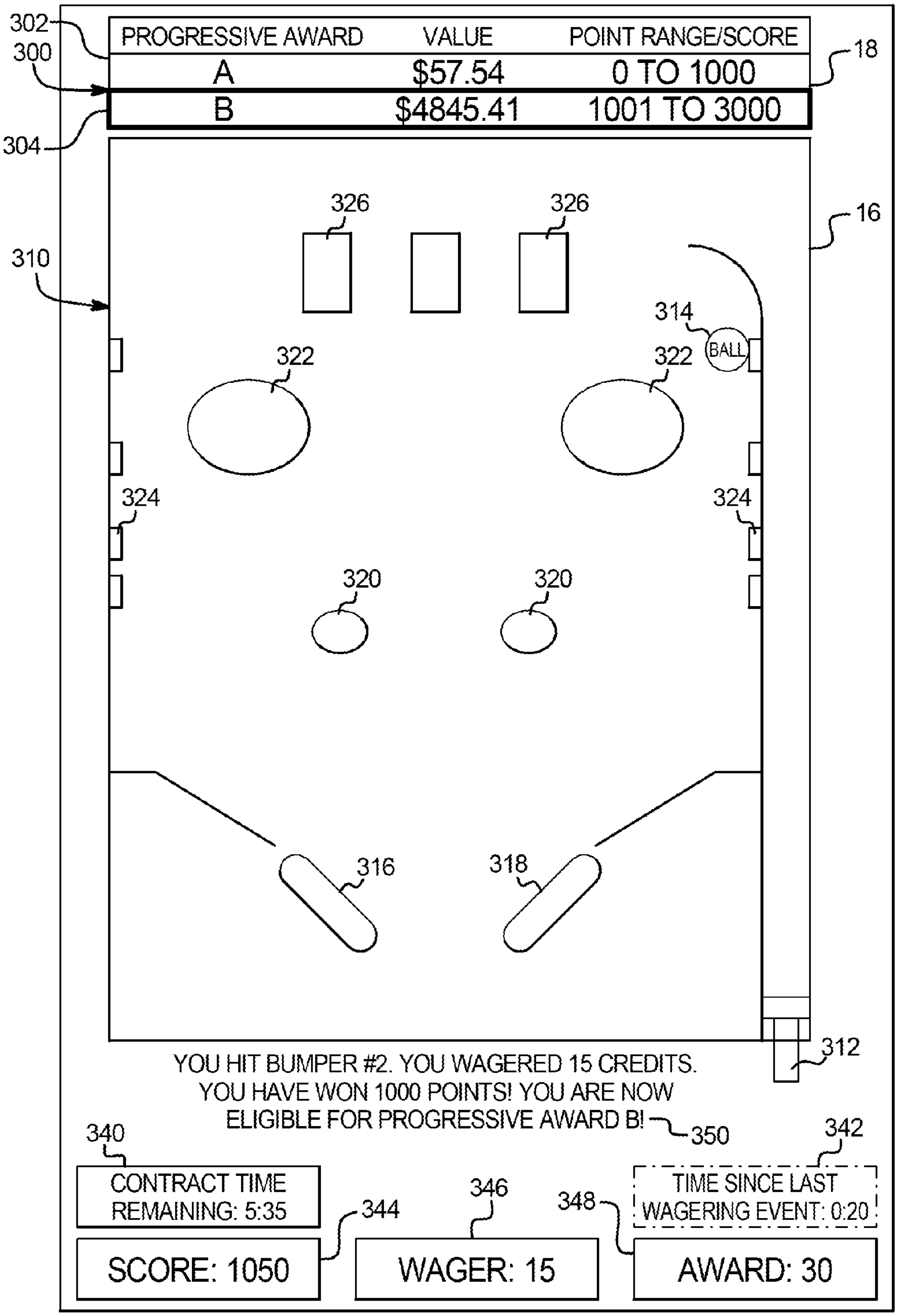
FIG. 10 is an enlarged front plan view of a display device of the gaming device disclosed herein, which illustrates an example of one embodiment of the present disclosure in accordance with FIG. 6.

In the embodiment illustrated in FIG. 10, the player, through skill in the pinball game, has caused the ball 314 to hit one of the rails 324. In this embodiment, causing the ball 314 to hit one of the rails 324 constitutes an occurrence of a second wagering event.

For the second wagering event, the gaming system determines the wager to be fifteen credits because fifteen seconds have elapsed since the first wagering event (as indicated by the wager event display 342) and the contract has a value of one cent per second. Wager display 346 indicates that the player wagered fifteen credits as a result of the player causing the ball 314 to contact the rail 324.

For the second wagering event, the gaming system also determines whether to provide the player with an award, a quantity of points or both based, at least in part, on the player's skill which caused the ball 314 to contact the rail 324. In this embodiment, hitting the rail 324 results in the gaming system providing the player with one-thousand points. Score display 344 increments by one-thousand points to one-thousand-fifty points.

The progressive award eligibility display area 300 indicates that the player is now currently eligible to potentially win the second progressive award (e.g., progressive award B) which is currently valued at $4845.41 because the player's score of one-thousand-fifty points falls within the range of points associated with the second progressive award (e.g., one-thousand points to three-thousand points). Message area 350 displays a suitable message such as "YOU ARE NOW ELIGIBLE FOR PROGRESSIVE AWARD B!"

Figure 11:
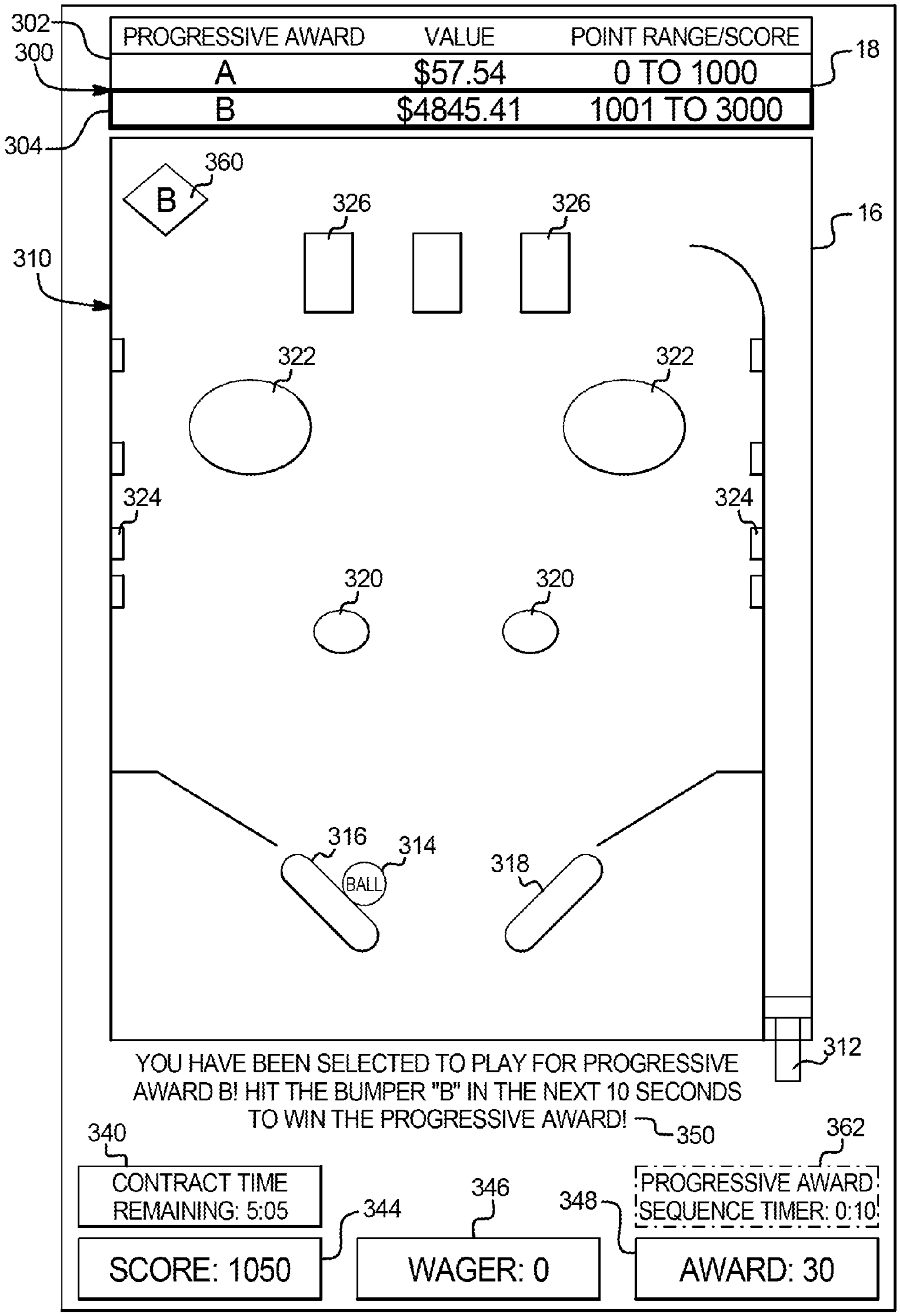
FIG. 11 is an enlarged front plan view of a display device of the gaming device disclosed herein, which illustrates an example of one embodiment of the present disclosure in accordance with FIG. 6.

Referring now to FIG. 11, a progressive award triggering event associated with the second progressive award (e.g., progressive award B) has occurred. In one embodiment, the gaming system causes a triggering event associated with the second progressive award to occur during the pinball game. In one embodiment, the triggering event randomly occurs during the pinball game. After the progressive award triggering event associated with the second progressive award occurs, the gaming system determines whether to enable the player to play for the second progressive award. In one embodiment, as described above, the gaming system randomly determines whether the player who is currently eligible for the second progressive award will be provided the opportunity or progressive award sequence to potentially win that progressive award.

After the gaming system determines that the player will play for the second progressive award, message area 350 displays a suitable message such as "YOU HAVE BEEN SELECTED TO PLAY FOR PROGRESSIVE AWARD B! HIT THE BUMPER "B" IN THE NEXT 10 SECONDS TO WIN THE PROGRESSIVE AWARD!" to inform the player that a progressive sequence associated with the second progressive award will begin.

In the embodiment illustrated in FIG. 11, the gaming system displays a progressive award sequence associated with the second progressive award. The gaming system indicates a designated one of the game elements (e.g., a designated bumper "B" 360) as the displayed progressive award sequence. In this embodiment, if the player is able to cause the ball to interact with (e.g., hit) the designated bumper 360 within the time indicated by progressive award sequence timer 362 through the player's skill, the gaming system causes the second progressive award to be provided to that player based on that player's skill in the progressive award sequence.

As illustrated in FIG. 11, the progressive award sequence timer 362 replaced the wagering event display 342 on the display device 16 in this embodiment. It should be appreciated that the display device 16 could display both the wagering event display 342 and the progressive award sequence timer 362 and that one or more wagering events could occur during the progressive award sequence.

In one embodiment, the gaming system indicates a designated series of the game elements (e.g., a series of designated bumpers) as the displayed progressive award sequence. In one such embodiment, if the player is able to cause the ball to interact with (e.g., hit) the designated series of bumpers through the player's skill, the gaming system causes the second progressive award to be provided to that player based on that player's skill in the progressive award sequence.

Figure 12:
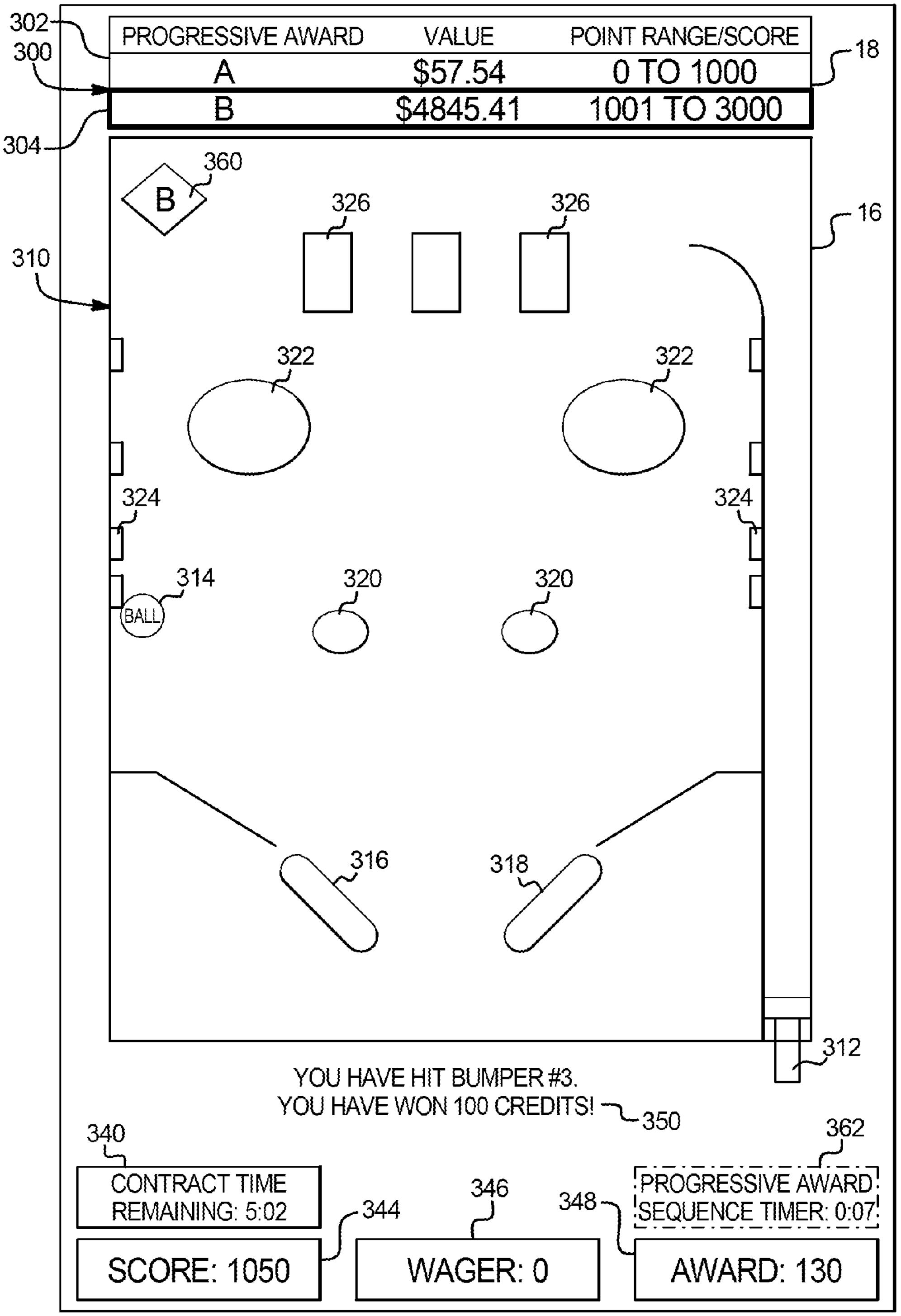
FIG. 12 is an enlarged front plan view of a display device of the gaming device disclosed herein, which illustrates an example of one embodiment of the present disclosure in accordance with FIG. 6.

Referring now to FIG. 12, the progressive award sequence has seven seconds remaining as indicated by the progressive award sequence timer 362. The player has caused the ball 314 to contact one of the rails 324 through skill, which in this embodiment, causes the gaming system to provide the player with one-hundred credits. Award display 348 indicates that the player has won one-hundred-thirty credits during the play of the skill-based pinball game 310.

Figure 13:
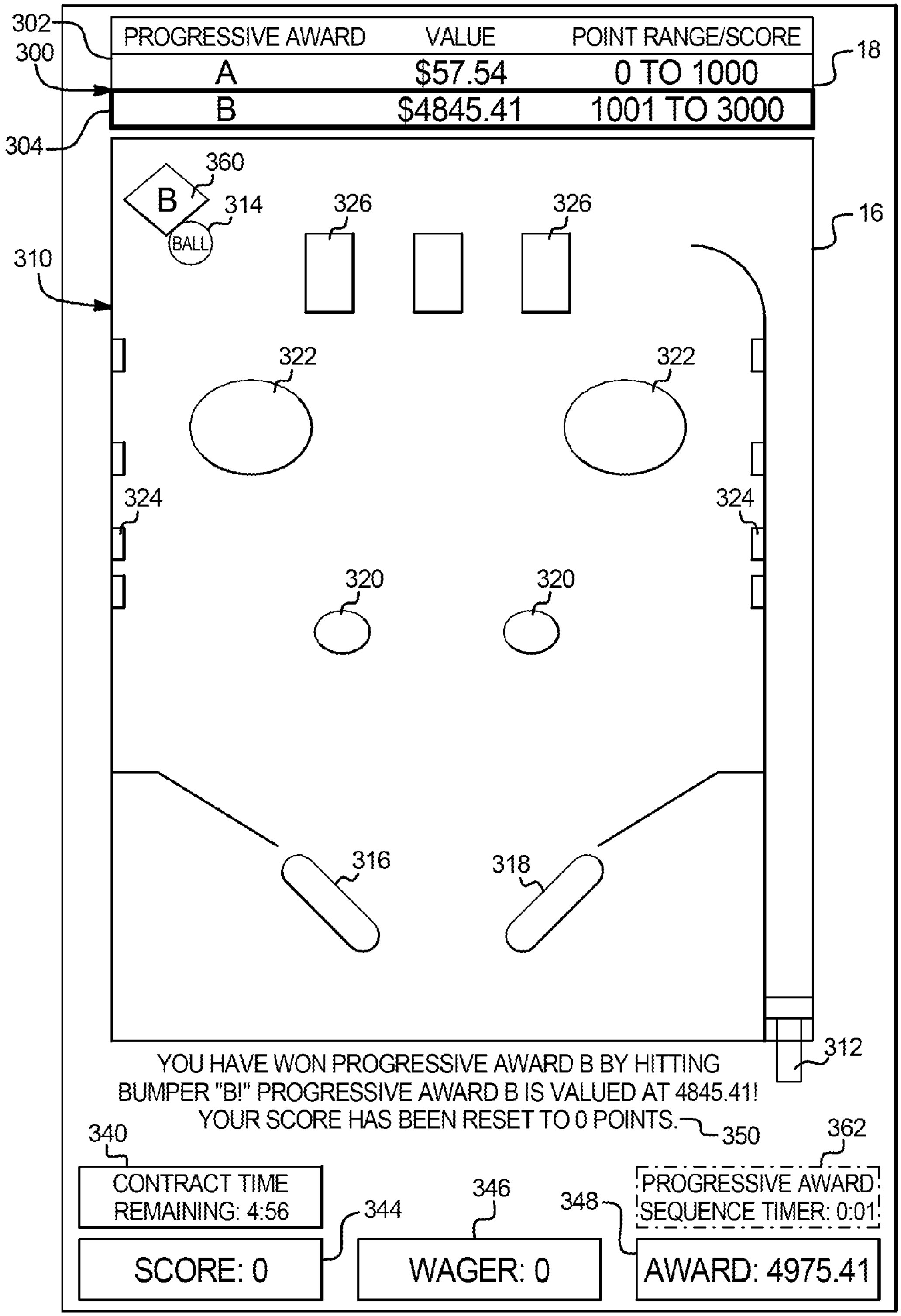
FIG. 13 is an enlarged front plan view of a display device of the gaming device disclosed herein, which illustrates an example of one embodiment of the present disclosure in accordance with FIG. 6.

Referring now to FIG. 13, the progressive award sequence has one second remaining as indicated by the progressive award sequence timer 362. The player has caused the ball 314 to contact the designated bumper 360 within the time indicated by progressive award sequence timer 362 through the player's skill. Accordingly, the gaming system causes the second progressive award (e.g., progressive award B currently valued at $4845.41) to be provided to the player based on that player's skill in the progressive award sequence. Award display 348 indicates that the player has won over four-thousand-nine-hundred-seventy-five credits during the play of the skill-based pinball game 310. Message display 350 indicates a suitable message, such as "YOU HAVE WON PROGRESSIVE AWARD B BY HITTING BUMPER 'B!' PROGRESSIVE AWARD B IS VALUED AT $4845.41!"

Score display 344 indicates that the player's score reset to zero points after that player won the second progressive award. Message display 350 indicates a suitable message, such as "YOUR SCORE HAS BEEN RESET TO 0 POINTS." In one embodiment, the gaming system reduces, but does not reset, the player's score. In another embodiment, the gaming system maintains the player's score (i.e., does not reset the player's score) after the player wins one of the progressive awards.

In one embodiment, since the progressive award sequence timer 362 has time remaining, the gaming system enables the player to continue trying to cause the ball 314 to contact the designated bumper 360. If the player causes the ball 314 to contact the designated bumper 360, the gaming system provides the second progressive award valued at its initial value (or reset value) to the player.

As illustrated in FIG. 13, the contract time remaining display 340 has three minutes and fifty-six seconds remaining. The player continues playing the skill-based pinball game 310 as described above until the contract time remaining display 340 displays zero.

In one embodiment, the gaming system causes the wager to be placed in its entirety upon a cash out request received from the player. That is, if the player presses the cash out button 34, the gaming system causes the entire wager (e.g., the contract price paid by the player to play the partial skill-based game for the contract duration) to be placed for the partial skill-based game. In an alternative embodiment, if the player presses the cash out button 34 without using the entire wager in the partial skill-based game, the gaming system refunds any unused portion of the wager to the player.

In one embodiment, the gaming system allocates a portion of the entire wager to one or more of the progressive awards. For example, the gaming system monitors each of the gaming machines and after completion of the partial skill-based game, the gaming system determines how much the player at each of the gaming machines wagered in the partial skill-based game. In this embodiment, the gaming system allocates a portion of the amount wagered by each player to one or more of the progressive awards.

In one embodiment, the gaming system allocates a portion of each wager component of the entire wager to one or more of the progressive awards. For example, the player pays the entire wager to play the partial skill-based game for a designated period of time. For each wagering event, the gaming system determines a wager component (i.e., part of the entire wager) for that wager event. That is, the entire wager funds each one of the wagering components.

Figure 14:
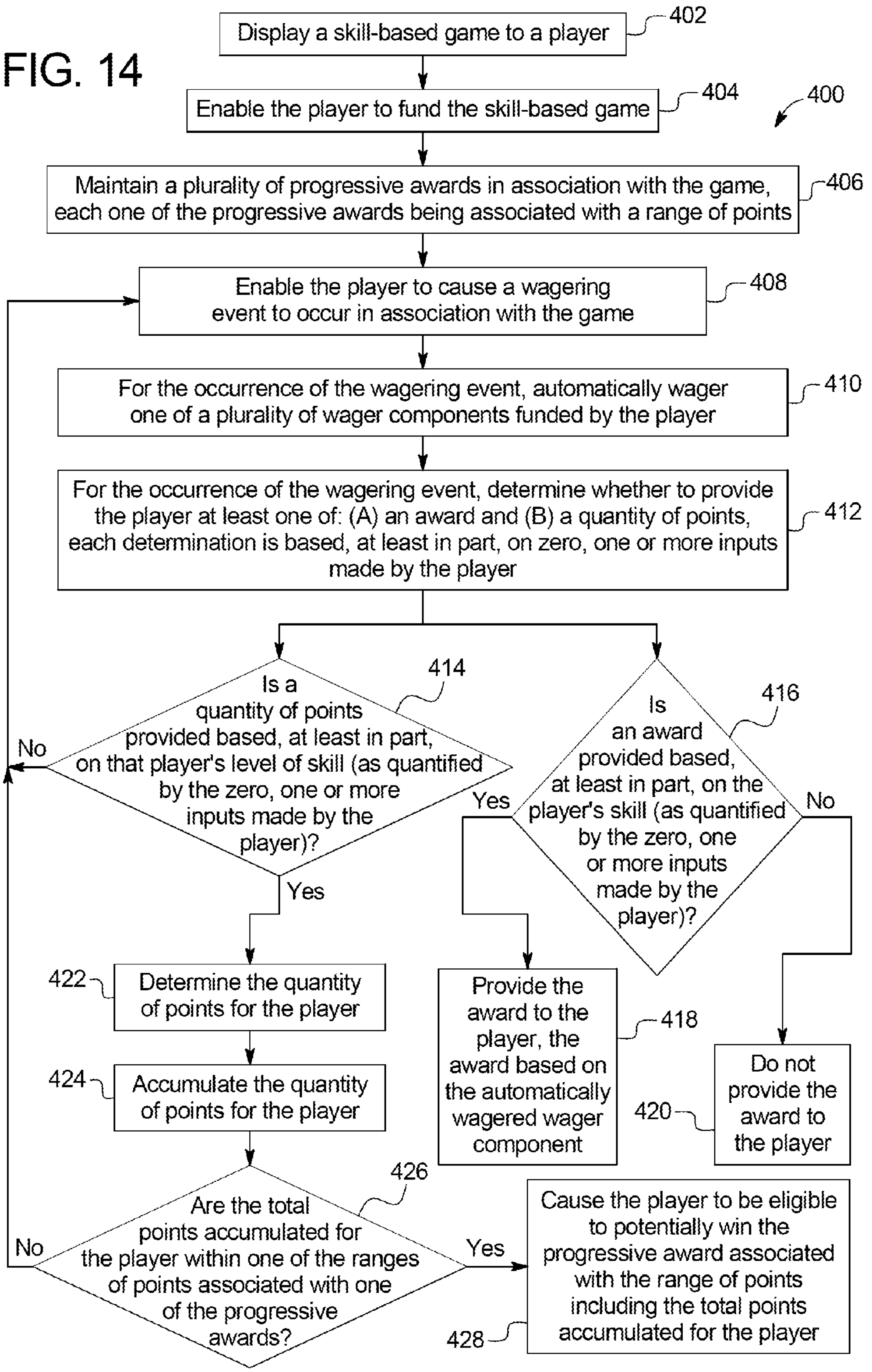
FIG. 14 is a process flow diagram showing one possible flow sequence of one embodiment of the present disclosure.

Referring now to FIG. 14, a flowchart of an example process 400 for operating a gaming system or a gaming device disclosed herein is illustrated. In one embodiment, this process 400 is embodied in one or more software programs stored in one or more memories and executed by one or more processors or controllers. Although this process 400 is described with reference to the flowchart illustrated in FIG. 14, it should be appreciated that many other methods of performing the acts associated with this process may be used. For example, the order of certain of the blocks described may be changed, or certain of the blocks described may be optional.

In the embodiment illustrated in FIG. 14, the gaming system causes at least one display device of one of the gaming machines in the gaming system to display a partial skill-based game to a player as indicated in block 402 (and described above with reference to block 102 of FIG. 3). The gaming system (or the progressive gaming system host site computer described above) maintains a plurality of progressive awards in association with the partial skill-based game as indicated in block 406 (and described above with reference to block 104 of FIG. 3).

In one embodiment, the gaming system enables the player to fund the partial skill-based game with a total wager amount (e.g., the player's fund) as indicated in block 404 in FIG. 14. After designated wagering events occur in association with the partial skill-based game as indicated in block 408 (and described above with reference to block 106 of FIG. 3), the gaming system divides this total wager amount into a plurality of wager components which the gaming system automatically wagers for the player as indicated in block 410.

In one embodiment, the gaming system enables players to play an interactive partial skill-based game and make wager components during the partial skill-based game, wherein the wagering outcome for each wager component is independent from the partial skill-based game. In one embodiment, the player funds the gaming machine (e.g., the player's fund). For example, the player may fund the gaming machine with an amount of credits and choose the amount or value of the wager components. During play of the interactive game, upon the occurrence of a wager triggering event, the gaming machine causes one of the designated wagering events to occur which includes a placement of a wager component. Multiple wagering events can occur during the play of the interactive partial skill-based game.

For the occurrence of the wagering event, the gaming system determines whether to provide the player an award, a quantity of points, or both for the wagering event as indicated in block 412 (as described above with reference to block 108 of FIG. 3). In the embodiment illustrated in FIG. 14, this determination is based, at least in part, on zero, one or more inputs made by the player in the partial skill-based game. That is, for the wagering event as indicated in block 412 of this embodiment, the determination whether to provide the player an award, a quantity of points, or both is based on zero, one or more inputs made by the player which tend to measure one or more aspects of that player's skill in the partial skill-based game.

After the occurrence of the wagering event, the gaming system determines whether to provide the player with an award (e.g., a partial skill-based game award) based on zero, one or more inputs made by the player which tend to measure that player's level of skill in the partial skill-based game as indicated in block 414. If the gaming system determines to provide the player with an award based on that player's skill in the partial skill-based game, the gaming system provides the determined award to the player as indicated in block 418. In one embodiment, the determined award is based on the automatically wagered wager component as indicated in block 418. However, if the gaming system determines not to provide the player with an award based on that player's skill in the partial skill-based game, the gaming system does not provide the determined award to the player as indicated by block 420.

After the occurrence of the wagering event, the gaming system also determines whether to provide the player with a quantity of points based on zero, one or more inputs made by the player which tend to measure that player's level of skill in the partial skill-based game as indicated in block 416. If the gaming system determines not to provide the player with a quantity of points based on the player's skill in the partial skill-based game, the gaming system enables the player to continue playing the partial skill-based game and further enables that player to cause another wagering event in association with the partial skill-based game as described above and indicated in block 408. However, if the gaming system determines to provide the player with a quantity of points based on the player's skill in the partial skill-based game, the gaming system determines the quantity of points to provide (or otherwise accumulate for) the player as indicated in block 422. In one embodiment, the gaming system determines the quantity of points to provide the player based on the automatically wagered wager component indicated in block 410. In another embodiment, the gaming system determines the quantity of points to provide the player based on the player's level of skill in the partial skill-based game and the automatically wagered wager component indicated in block 410.

After the gaming system determines a quantity of points to provide to the player, the gaming system accumulates the determined quantity of points for the player as indicated in block 424. In one embodiment, the gaming system accumulates different quantities of points for the player based on different skill-based events which occur in response to the player making zero, one or more inputs during the play of the partial skill-based game (e.g., interactions with game elements of the partial skill-based game).

After accumulating any points for the player, the gaming system determines whether the total amount of points accumulated for the player are within one of the ranges of points associated with one of the progressive awards as indicated by block 426 of FIG. 14 (and as described above with reference to block 122 of FIG. 3). That is, the gaming system compares the total amount of points accumulated for the player (i.e., the player's score) to each of the ranges of points (e.g., score levels) associated with the maintained progressive awards. The gaming system determines whether the player's score falls within one of the ranges of points associated with one of the progressive awards.

If the gaming system determines that the player's score falls outside one of the ranges of points, the gaming system enables the player to continue playing the partial skill-based game and enables that player to cause another wagering event in association with the partial skill-based game as indicated in block 408. However, if the gaming system determines that the player's score falls within one of the ranges of points, the gaming system causes the player to be eligible to potentially win the progressive award associated with the range of points including the total points accumulated for the player (i.e., the player's score) as indicated in block 428 of FIG. 14 (and as described above with reference to block 124 of FIG. 3).

In addition to the wagering outcome, as the player makes zero, one or more inputs in the interactive partial skill-based game, one embodiment of the gaming system provides the player points for the interactive partial skill-based game based on the player's inputs and independent of any wagering outcomes. In one embodiment, the player is enabled to play the partial skill-based game until the player's fund amount is depleted, the game ends or the player elects to stop playing. At the end of the game the gaming machine provides the player with the player's fund which is independent of the interactive game outcome (if the player has credits left) and an interactive game outcome that is independent of any credits won or lost for wagering events.

In one embodiment, upon completion of the interactive partial skill-based game, the gaming system: (a) provides the player with any awards, any quantities of points or both based on the determined wagering outcomes for the wagering events that occurred during or in association with the play of the partial skill-based game; and (b) displays the determined interactive game outcome that is based on how the player did in the interactive game.

In certain embodiments, the partial skill-based game outcome is independent of the wagering events. That is, the partial skill-based game outcome is based, at least in part, on zero, one or more inputs made by the player and is not based on an amount of a wager component or a wagering outcome. In other embodiments, the wagering outcomes are randomly determined independently of any inputs made by the player in partial skill-based game and the interactive game outcome.

In one embodiment, the player initiates both an interactive game session and a wagering session upon making a specified input at the gaming machine. In one embodiment, the player makes an initial funding of the gaming machine to initiate the interactive game. In other embodiments, the player selects apertures such as a maximum amount of credits which may be wagered in association with the partial skill-based game. For example, a player may select to fund the gaming machine with an initial fund and determine the amount of the wager components. In one embodiment, when a player wins awards associated with the wagering outcomes, the awards are added to the initial funds. As long as there are credits left in the fund, the player may continue to play the partial skill-based game. Each time a wager triggering event occurs, the gaming machine or system automatically removes the wager component amount from the fund. Wager components are invoked at stages during the interactive game's progression.

In one embodiment, to place the wager component within the same interactive game session, the player must be able to reach the next marker. The marker may be any suitable marker, such as an increased point accumulation, a visible or audible milestone within a video game or an amount of time. In one embodiment, the marker is reached based, at least in part, on the player's skill. The wagering outcome of each wager component is determined in a manner consistent with games of chance and is not linked to or dependent on the skill or strategy demonstrated during the partial skill-based game or competition game. The interactive game continues until the player either loses at a decisive state of the skill-based or competition game, elects to stop playing, runs out of funds or finishes the partial skill-based game.

It should be appreciated that certain portions of the method and gaming system described in FIG. 14 are further described in co-pending U.S. Published Patent Application Number 2008/0108406, which was filed on Jun. 25, 2007 and which is a continuation-in-part of U.S. Published Patent Application Number 2008-0108425, which was filed on Nov. 8, 2006.

Figure 15:
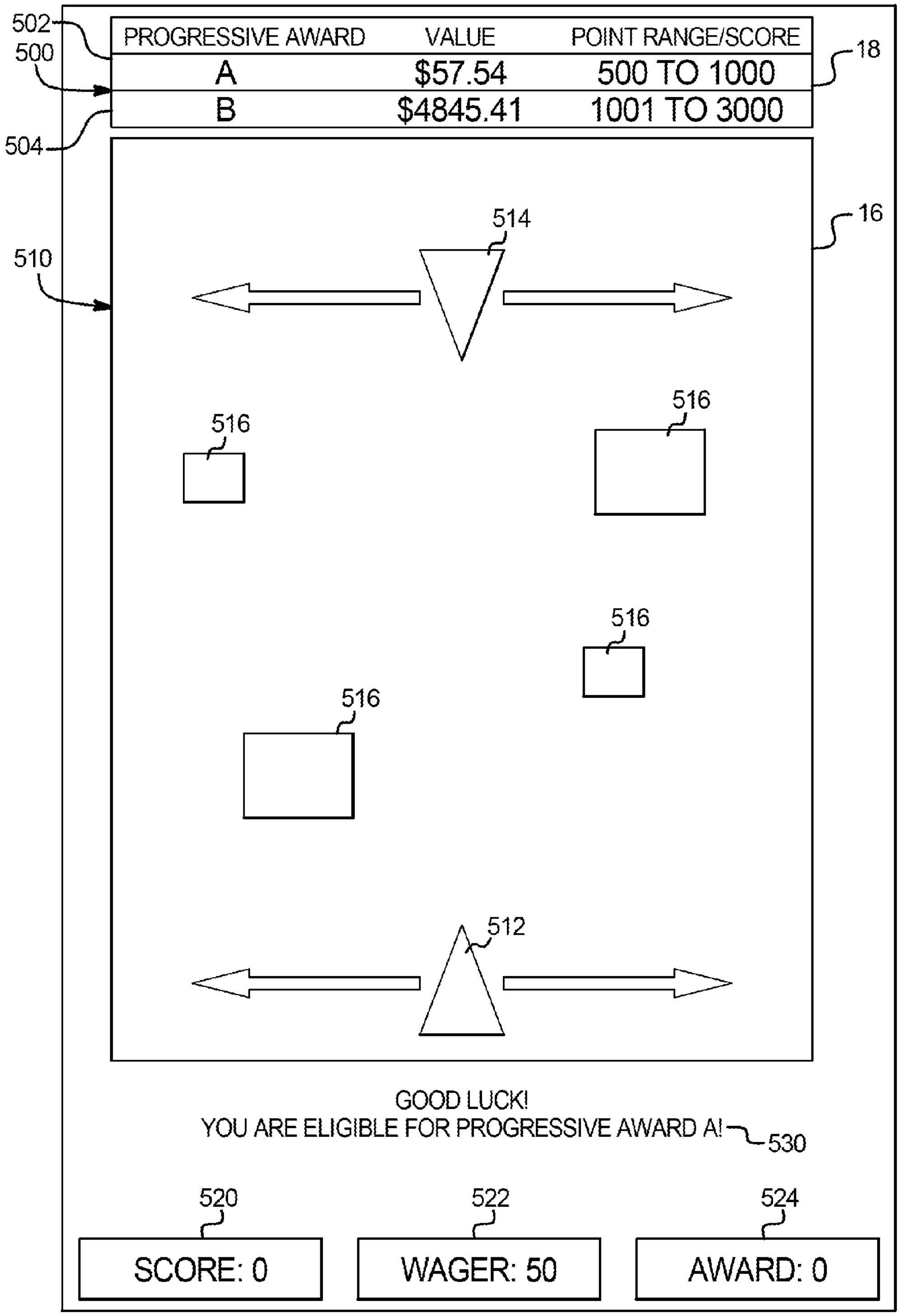
FIG. 15 is an enlarged front plan view of a display device of the gaming device disclosed herein, which illustrates an example of one embodiment of the present disclosure in accordance with FIG. 14.

Referring now to FIGS. 15 to 20, the gaming system displays a progressive award eligibility display area 500 on the upper display device 18 and displays a partial skill-based game 510, such as a shooting game, on the central display device 16. As illustrated, the shooter game 510 includes a player-controlled aircraft 512, an opponent aircraft 514, and a plurality of objects or game elements (e.g., asteroids) 516. In the shooter game 510, a player makes zero, one or more inputs to control aircraft 512 and attempt to shoot other aircraft 514 or objects (e.g., asteroids) 516 to win awards, score points, or both. As illustrated in FIG. 15, the player-controlled aircraft 512 and the opponent aircraft 514 both move laterally as shown by double-sided arrows. In one embodiment, the shooter game provides awards, points or both to the player based on an amount of time the player controls the aircraft 512 without being shot by an opponent aircraft 514 or without colliding with the opponent aircraft 514 or one of the objects 516.

In one embodiment, the progressive award eligibility display area 500 shows separate display areas 502, 504 associated with respective first and second progressive awards. The progressive award eligibility display area 500 and display areas 502, 504 operate in the same manner as the progressive award eligibility display area 300 and display areas 302, 304 described above with reference to FIGS. 8 to 13. In this embodiment, the progressive award eligibility display area 500 and display areas 502, 504 display progressive awards which correspond to the progressive awards described above with reference to chart 180 of FIG. 5B.

As illustrated in FIG. 15, the player is not currently eligible for any of the progressive awards shown by display areas 502, 504 because neither progressive award is associated with a range of points that includes zero points, which is the total points accumulated for the player at this point of the shooter game 510 (as indicated by score display 520).

In one embodiment, the gaming system enables the player to initiate the skill-based shooter game 510 by funding a gaming machine. In the embodiment illustrated in FIG. 15, a player inserts $50 as an initial fund as indicated by the wager display 522 (where each credit equals $1). In this embodiment, the player selects a wager component amount of $1 (where each credit equals $1). That is, for each occurrence of a wagering event, the gaming system automatically removes $1 from the player's fund. If the first wagering event results in an unsuccessful outcome, the player's fund is $49. If the first wagering event results in a successful outcome, the gaming system determines an award, a quantity of points or both for the player, such as $5, 5 points or both (e.g., $5 and 5 points). In one embodiment, the gaming system provides any award indicated by the award display 524 to the player, which would be $54 ($50-$1+$5) after the player's initial funds are depleted. In another embodiment, the gaming system adds any award indicated by the award display 524 to the initial funds during the partial skill-based game.

During the skill-based shooter game 510, the gaming system determines whether one or more wagering events occur. In different embodiments, a wagering event for the skill-based shooter game 510 includes an event that causes the player-controlled aircraft 512 to shoot or collide with the opponent aircraft 514, the player-controlled aircraft 512 to shoot or collide with one of the objects 516, the player-controlled aircraft 512 to dodge or avoid shots from the opponent aircraft 514, the player-controlled aircraft 512 to dodge or avoid one of the objects 516, or any other suitable event in association with the shooter game 510. As illustrated in FIGS. 15 to 20, a wagering component, such as $1 or $2, is deducted from the player's fund for each bullet shot by the player-controlled aircraft 512.

Score display 520 indicates any points provided to (or otherwise accumulated for) the player based on the player's skill in the skill-based shooter game 510. Wager display 522 indicates an amount of credits or value in the player's fund in association with the skill-based shooter game 510. As described above, the player's fund indicated by the wager display 522 decreases for each wager component automatically placed by the gaming system. Award display 524 indicates a total award provided to the player based on the player's skill in the skill-based shooter game 510.

Message area 530 indicates appropriate messages or instructions such as "GOOD LUCK!" and "YOU ARE ELIGIBLE FOR PROGRESSIVE AWARD A!" to the player visually, or through suitable audio or audiovisual displays. The gaming system causes the message area 530 to display messages or instructions which inform the player about certain aspects of the skill-based shooter game 510.

Figure 16:
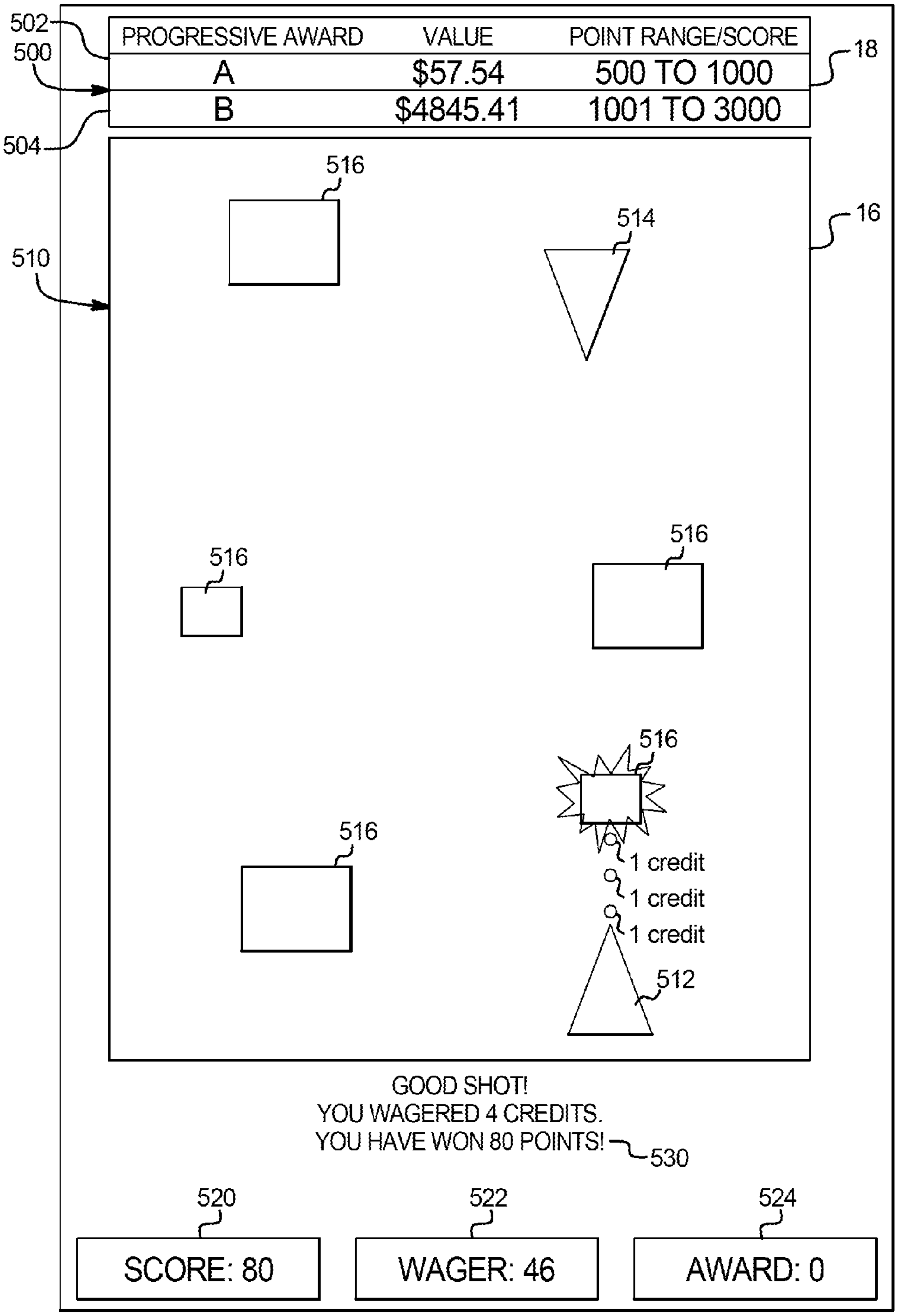
FIG. 16 is an enlarged front plan view of a display device of the gaming device disclosed herein, which illustrates an example of one embodiment of the present disclosure in accordance with FIG. 14.

Referring to FIG. 16, the player caused the player-controlled aircraft 512 to shoot four bullets. Each bullet is associated with a wager component of $1. Three bullets did not reach object 516, but one bullet hit or collided with the object 516. As a result of the player's skill in the skill-based shooter game 510, the gaming system provides the player with eighty points as indicated by the score display 520. The gaming system deducts $4 from the player's fund indicated by the wager display 522 (four bullets=four wager components at $1 each). The wager display 522 decreases from $50 to $46.

Figure 17:
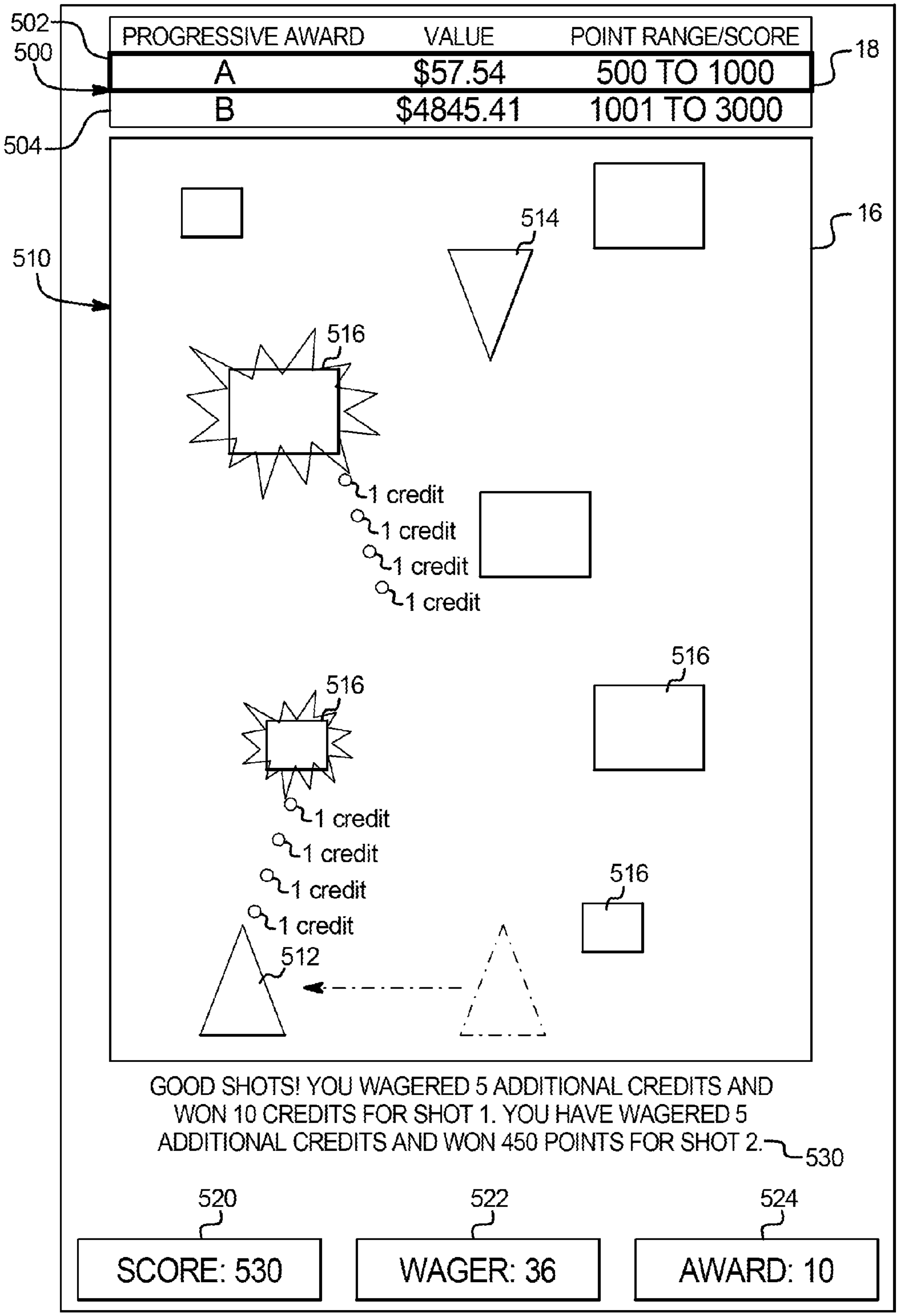
FIG. 17 is an enlarged front plan view of a display device of the gaming device disclosed herein, which illustrates an example of one embodiment of the present disclosure in accordance with FIG. 14.

Referring now to FIG. 17, the player caused the player-controlled aircraft 512 to take two shots (each including five bullets). Each bullet is associated with a wager component of $1. For each shot, one bullet hit or collided with one of the objects 516. As a result of the player's skill in the skill-based shooter game 510, the gaming system provides the player with four-hundred-fifty points as indicated by the score display 520 and ten credits as indicated by the award display 524. The gaming system deducts $10 from the player's fund indicated by the wager display 522 (ten bullets=ten wager components at $1 each). The wager display 522 decreased from $46 to $36.

As illustrated in FIG. 17, the score display 520 increases to five-hundred-thirty points. The player is currently eligible for the first progressive award (e.g., progressive award A) as shown by display area 502 because the first progressive award is associated with the range of points that includes five-hundred points to one-thousand points, which includes the five-hundred-thirty total points accumulated for the player at this point of the shooter game 510 (as indicated by score display 520).

Figure 18:
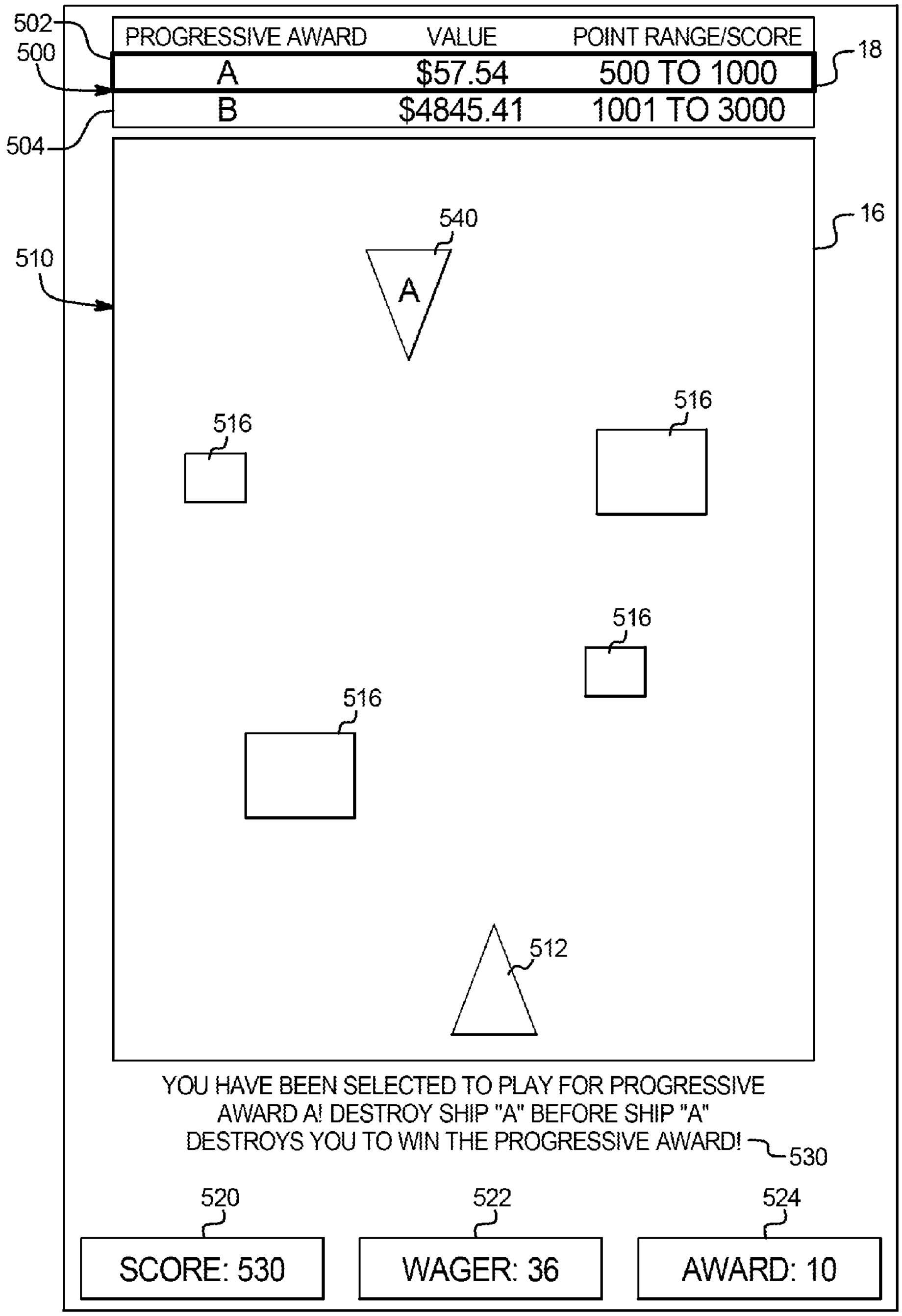
FIG. 18 is an enlarged front plan view of a display device of the gaming device disclosed herein, which illustrates an example of one embodiment of the present disclosure in accordance with FIG. 14.

Referring now to FIG. 18, a progressive award triggering event associated with the first progressive award (e.g., progressive award A) has occurred. In one embodiment, the gaming system causes a triggering event associated with the first progressive award to occur during the shooter game. In one embodiment, the triggering event randomly occurs during the shooter game. After the progressive award triggering event associated with the first progressive award occurs, the gaming system determines whether to enable the player to play for the first progressive award. In one embodiment, as described above, the gaming system randomly determines whether the player who is currently eligible for the first progressive award will be provided the opportunity or progressive award sequence to potentially win that progressive award.

After the gaming system determines that the player will play for the first progressive award, message area 530 displays a suitable message such as "YOU HAVE BEEN SELECTED TO PLAY FOR PROGRESSIVE AWARD A! DESTROY SHIP 'A' BEFORE SHIP 'A' DESTROYS YOU TO WIN THE PROGRESSIVE AWARD!" to inform the player that a progressive sequence associated with the first progressive award will begin.

Figure 19:
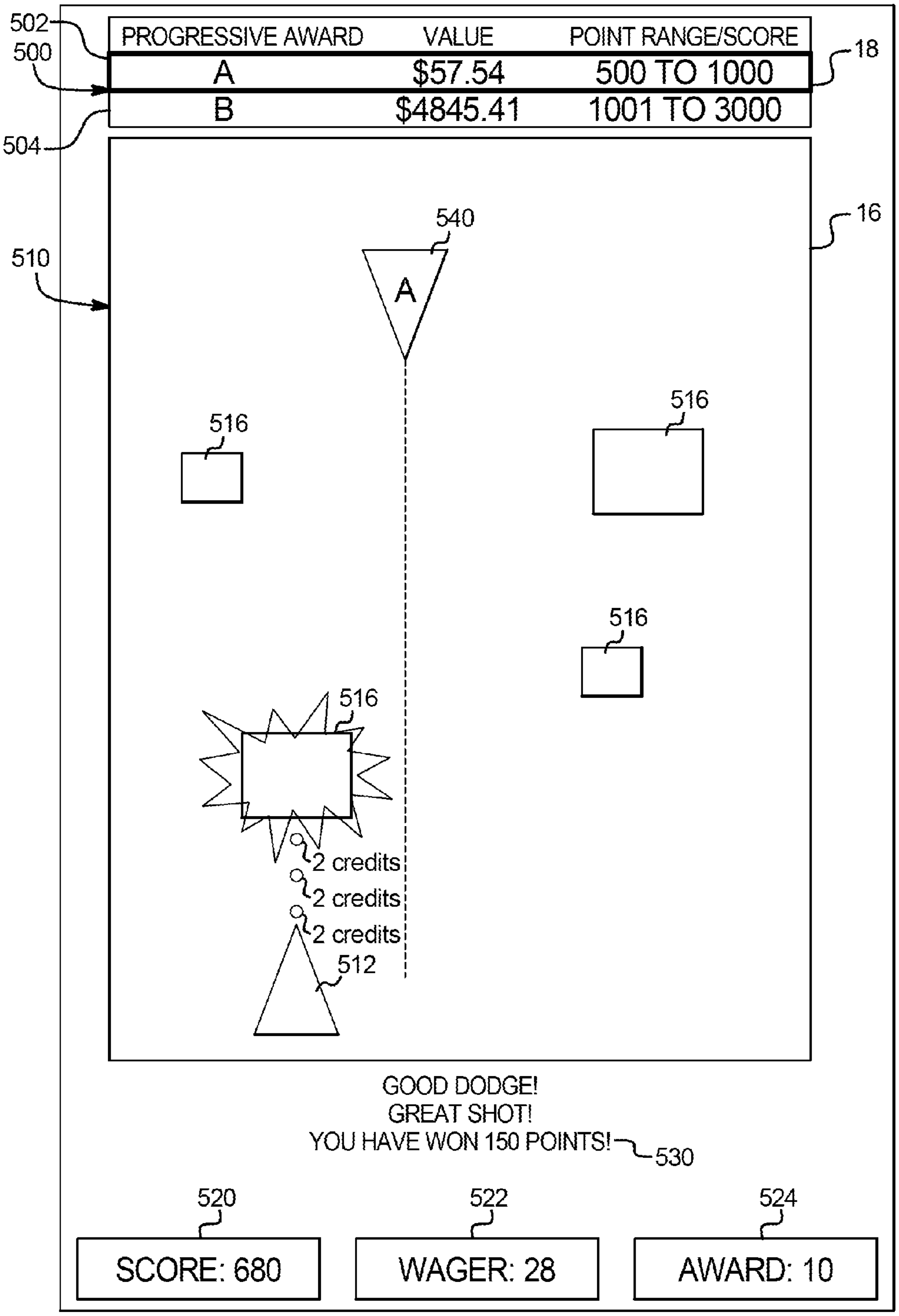
FIG. 19 is an enlarged front plan view of a display device of the gaming device disclosed herein, which illustrates an example of one embodiment of the present disclosure in accordance with FIG. 14.

In the embodiment illustrated in FIGS. 18 and 19, the gaming system displays a progressive award sequence associated with the first progressive award (e.g., progressive award A). The gaming system indicates one of the game elements (e.g., a designated opponent aircraft 540) as the displayed progressive award sequence. In this embodiment, if the player is able to destroy the designated opponent aircraft 540 (or hit the aircraft 540) before being destroyed (or hit) by the designated opponent aircraft 540 through the player's skill, the gaming system causes the first progressive award to be provided to that player based on that player's skill in the progressive award sequence.

As illustrated in FIG. 19, the player controlled the aircraft 512 to shoot four bullets to hit one of the objects 516. In this illustrated example, each bullet shot by the player-controlled aircraft 512 is associated with a wagering component, such as $2. Additionally, through skill, the player maneuvered the player-controlled aircraft 512 to dodge bullets shot by the designated opponent aircraft 540. The gaming system determined to provide the player with one-hundred-fifty points for shooting one of the objects 516 and dodging the opponent's bullets. Score display 520 increases to six-hundred-eighty-points. The gaming system deducts $8 from the player's fund indicated by the wager display 522 (four bullets=four wager components at $2 each). The wager display 522 decreases from $36 to $28.

In another embodiment (not shown), each bullet shot that hits one of the objects (i.e., a successful shot) is associated with a wagering component. This embodiment enables a gaming system designer additional control and flexibility in designing the applicable paytable and applicable average expected payback percentage of such a gaming system by at least partially reducing the effect of the player's accuracy/skill in the progressive award sequence.

Figure 20:
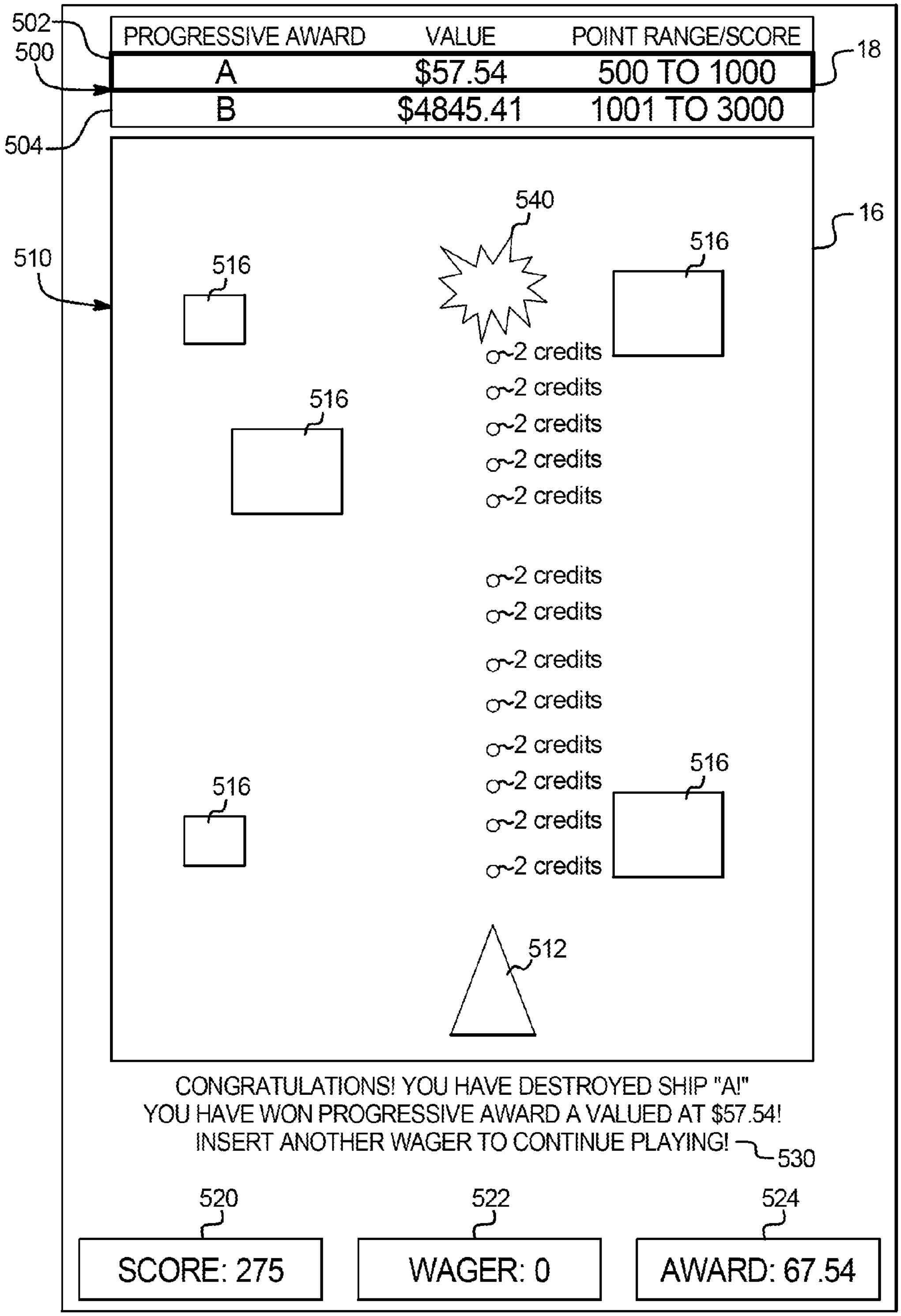
FIG. 20 is an enlarged front plan view of a display device of the gaming device disclosed herein, which illustrates an example of one embodiment of the present disclosure in accordance with FIG. 14.

Referring now to FIG. 20, the player controlled the aircraft 512 to shoot fourteen bullets at the designated opponent aircraft 540. Based on the player's skill in the progressive award sequence, one bullet hit the designated opponent aircraft 540. Accordingly, the gaming system causes the first progressive award (e.g., progressive award A currently valued at $57.54) to be provided to the player based on that player's skill in the progressive award sequence. Award display 524 indicates that the player has won over sixty-seven credits during the play of the skill-based shooter game 510. Message display 530 indicates a suitable message, such as "CONGRATULATIONS!" and "YOU HAVE WON PROGRESSIVE AWARD A VALUED AT $57.54!"

As illustrated in FIG. 20, the gaming system deducts $28 from the player's fund indicated by the wager display 522 (fourteen bullets=fourteen wager components at $2 each). The wager display 522 decreases from $28 to $0. In this embodiment, the player's fund amount is depleted and the partial skill-based game ends. In one embodiment, the gaming system enables the player select whether to be provided the award indicated by the award display 524 or whether to transfer that award amount to the player's fund.

In one embodiment, the gaming system associates an indicator with each one of the progressive awards. Depending upon the embodiment, the gaming system employs indicators with each one of the progressive awards to foreshadow or enable the player to anticipate at least one of: (i) eligibility to win one of the progressive awards (e.g., a different progressive award), (ii) an occurrence of a progressive award triggering event, or (iii) an occurrence of a progressive award sequence.

In one such embodiment, the indicator includes a visual indicator, such as a color or graphic, associated with each one of the progressive awards. For example, a first one of the progressive awards is associated with a first color and a second one of the progressive awards is associated with a second color. If the gaming system determines that a player is eligible to win the first progressive award, the gaming system indicates the first color in association with the partial skill-based game or game elements thereof. If the gaming system determines that a player is eligible to win the first progressive award, the gaming system indicates the first color in association with the skill-based progressive award sequence or game elements thereof.

In another such embodiment, the indicator includes an audible indictor, such as a sound, associated with each one of the progressive awards. For example, a first one of the progressive awards is associated with a first sound or audible indication and a second one of the progressive awards is associated with a second sound or audible indication. If the gaming system determines that a player is eligible for the second progressive award, the gaming system causes the second sound or audible indication to be played during the display of the partial skill-based game or game elements thereof. If the gaming system determines that a player is eligible to win the second progressive award, the gaming system causes the second sound or audible indication to be played during the display of the skill-based progressive award sequence or game elements thereof.

Information Provided to Player

In one embodiment, the gaming system displays one or more of the maintained progressive awards and the player's eligibility for each one of the displayed progressive awards. Referring back to FIGS. 8 and 15, the gaming system displays a progressive award eligibility display area which corresponds to one of the displayed progressive awards. In one embodiment, the progressive award eligibility display area represents one player's eligibility for each one of the displayed progressive awards. In this embodiment, the gaming system enables the player to become eligible for (or to become eligible to play for) one of the progressive awards based on the progressive award eligibility display area. In one embodiment, the progressive award eligibility meter display area indicates each of the plurality of progressive awards which the player is currently eligible to play for based on the number of points accumulated for that player.

As indicated above, suitable information about any one of the progressive awards, award generating events, and point generating events can be provided to the players through one or more displays on the gaming machines or additional information displays positioned near the gaming machines, such as above a bank of system gaming machines. In one embodiment, a metering and/or information display device may be used to display information regarding at least one of the progressive awards, the award generating events and the point generating events. This information can be used to entertain the player or inform the player that at least one of a progressive award triggering event, an award generation event, and a point generation event has occurred or will occur. Examples of such information, which can be provided to the players through any suitable audio, audio-visual or visual devices, include:

(1) that a progressive award and/or a point generating event has occurred;

(2) that a progressive award and/or a point generating event will shortly occur (i.e., foreshadowing the providing of a progressive award and/or foreshadowing the accumulation of a quantity of points for the player);

(3) that one or more progressive awards and/or one or more quantities of points have been provided to one or more players of the system gaming machines;

(4) which players have accumulated points;

(5) the amount or quantity of the points accumulated;

(6) the highest quantity of points accumulated;

(7) the lowest quantity of points accumulated;

(8) the average quantity of points accumulated;

(9) the number of games played, the number of interactions (with one of the game elements) and/or the total time since the last progressive award and/or the last point accumulation event has occurred;

(10) the number of points accumulated in a designated time period;

(11) an average amount of time between each point generation event occurring;

(12) that a skill-based progressive award sequence has occurred;

(13) that a skill-based progressive award sequence will shortly occur (i.e., foreshadowing the providing of a skill-based progressive award sequence in association with a partial skill-based game);

(14) an award provided in association with a skill-based progressive award sequence or a partial skill-based game;

(15) which players have won awards in association with a skill-based progressive award sequence or a partial skill-based game;

(16) the amount of the awards won in association with a skill-based progressive award sequence or a partial skill-based game;

(17) the highest award won in association with a skill-based progressive award sequence or a partial skill-based game;

(18) the average award won in association with a skill-based progressive award sequence or a partial skill-based game;

(19) an average amount of time between each skill-based progressive award sequence occurring; and

(20) an indicator, such as a color or sound, which associates one or more of the progressive awards with the partial skill-based game or the skill-based progressive award sequence.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one display device;

at least one input device;

at least one processor; and at least one memory device which stores a plurality of instructions, which when executed by the at least one processor, cause the at least one processor to:

(a) maintain a progressive award, (b) for a play of a partial skill-based game:

(i) enable a player to place a wager, (ii) enable the player to make at least one input, (iii) determine any award to provide the player, said determination being based, at least in part, on the at least one input made by the player, (iv) display to the player any determined award, (v) determine a quantity of points to accumulate for the player, said determination being based, at least in part, on the at least one input made by the player, and (vi) display to the player the determined quantity of points, and (c) determine whether to provide the maintained progressive award to the player, said determination being based on the quantity of points accumulated for the player.

2. The gaming system of claim 1, wherein the determination of any award to provide to the player for the play of the partial skill-based game is distinct from the determination of the quantity of points to accumulate for the player for the play of the partial skill-based game.

3. The gaming system of claim 1, wherein the quantity of points accumulated for the player include a plurality of progressive award points accumulated for the player.

4. The gaming system of claim 1, wherein: (i) the wager placed by the player for the partial skill-based game is associated with a designated period of time, and (ii) when executed by the at least one processor in response to the wager being placed by the player, the plurality of instructions cause the at least one processor to: (a) enable the player to play the partial skill-based game for the designated period of time, (b) determine whether at least one wagering event occurs in association with the partial skill-based game within the designated period of time, and (c) if the at least one wagering event occurs in association with the partial skill-based game within the designated period of time, determine a wager component based, at least in part, on one of: (1) an amount of time elapsed from any occurrence of a previous wagering event, and (2) an amount of time elapsed from a starting point of the designated period of time.

5. The gaming system of claim 1, wherein the wager placed by the player for the partial skill-based game is associated with a plurality of wager components, and wherein when executed by the at least one processor, the plurality of instructions cause the at least one processor to automatically wager one of the wager components after a designated wagering event occurs in association with the play of the partial skill-based game.

6. The gaming system of claim 1, wherein the at least one input made by the player includes at least one selected from the group consisting of: a quantifiable timing input, a quantifiable aiming input, a quantifiable physical strength input, a quantifiable knowledge input, a quantifiable reasoning input, and a quantifiable strategy input.

7. The gaming system of claim 1, wherein at least one of any determined award and the maintained progressive award is at least one selected from the group consisting of: a quantity of monetary credits, a quantity of non-monetary credits, a quantity of promotional credits, and a quantity of player tracking points.

8. A method of operating a gaming system, said method comprising:

(a) causing at least one processor to execute a plurality of instructions to maintain a progressive award, (b) for a play of a partial skill-based game:

(i) enabling a player to place a wager, (ii) enabling the player to make at least one input, (iii) causing the at least one processor to execute the plurality of instructions to determine any award to provide the player, said determination being based, at least in part, on the at least one input made by the player, (iv) causing at least one display device to display to the player any determined award, (v) causing the at least one processor to execute the plurality of instructions to determine a quantity of points to accumulate for the player, said determination being based, at least in part, on the at least one input made by the player, and (vi) causing the at least one display device to display to the player the determined quantity of points, and (c) causing the at least one processor to execute the plurality of instructions to determine whether to provide the maintained progressive award to the player, said determination being based on the quantity of points accumulated for the player.

9. The method of claim 8, wherein the determination of any award to provide to the player for the play of the partial skill-based game is distinct from the determination of the quantity of points to accumulate for the player for the play of the partial skill-based game.

10. The method of claim 8, wherein the quantity of points accumulated for the player include a plurality of progressive award points accumulated for the player.

11. The method of claim 8, wherein: (i) the wager placed by the player for the partial skill-based game is associated with a designated period of time, and (ii) which includes: (a) enabling the player to play the partial skill-based game for the designated period of time, (b) causing the at least one processor to execute the plurality of instructions to determine whether at least one wagering event occurs in association with the partial skill-based game within the designated period of time, and (c) if the at least one wagering event occurs in association with the partial skill-based game within the designated period of time, causing the at least one processor to execute the plurality of instructions to determine a wager component based, at least in part, on one of: (1) an amount of time elapsed from any occurrence of a previous wagering event, and (2) an amount of time elapsed from a starting point of the designated period of time.

12. The method of claim 8, wherein the wager placed by the player for the partial skill-based game is associated with a plurality of wager components, and which includes, causing the at least one processor to execute the plurality of instructions to automatically wager one of the wager components after a designated wagering event occurs in association with the play of the partial skill-based game.

13. The method of claim 8, wherein the at least one input made by the player includes at least one selected from the group consisting of: a quantifiable timing input, a quantifiable aiming input, a quantifiable physical strength input, a quantifiable knowledge input, a quantifiable reasoning input, and a quantifiable strategy input.

14. The method of claim 8, wherein at least one of any determined award and the maintained progressive award is at least one selected from the group consisting of: a quantity of monetary credits, a quantity of non-monetary credits, a quantity of promotional credits, and a quantity of player tracking points.

15. The method of claim 8, which is provided through a data network.

16. The method of claim 15, wherein the data network is an internet.

17. A non-transitory computer readable medium including a plurality of instructions, which when executed by at least one processor, cause the at least one processor to:

(a) maintain a progressive award, (b) for a play of a partial skill-based game:

(i) enable a player to place a wager, (ii) enable the player to make at least one input, (iii) determine any award to provide the player, said determination being based, at least in part, on the at least one input made by the player, (iv) cause at least one display device to display to the player any determined award, (v) determine a quantity of points to accumulate for the player, said determination being based, at least in part, on the at least one input made by the player, and (vi) cause the at least one display device to display to the player the determined quantity of points, and (c) determine whether to provide the maintained progressive award to the player, said determination being based on the quantity of points accumulated for the player.

18. The non-transitory computer readable medium of claim 17, wherein the determination of any award to provide to the player for the play of the partial skill-based game is distinct from the determination of the quantity of points to accumulate for the player for the play of the partial skill-based game.

19. The non-transitory computer readable medium of claim 17, wherein the quantity of points accumulated for the player include a plurality of progressive award points accumulated for the player.

20. The non-transitory computer readable medium of claim 17, wherein: (i) the wager placed by the player for the partial skill-based game is associated with a designated period of time, and (ii) when executed by the at least one processor in response to the wager being placed by the player, the plurality of instructions cause the at least one processor to: (a) enable the player to play the partial skill-based game for the designated period of time, (b) determine whether at least one wagering event occurs in association with the partial skill-based game within the designated period of time, and (c) if the at least one wagering event occurs in association with the partial skill-based game within the designated period of time, determine a wager component based, at least in part, on one of: (1) an amount of time elapsed from any occurrence of a previous wagering event, and (2) an amount of time elapsed from a starting point of the designated period of time.

21. The non-transitory computer readable medium of claim 17, wherein the wager placed by the player for the partial skill-based game is associated with a plurality of wager components, and wherein when executed by the at least one processor, the plurality of instructions cause the at least one processor to automatically wager one of the wager components after a designated wagering event occurs in association with the play of the partial skill-based game.

22. The non-transitory computer readable medium of claim 17, wherein the at least one input made by the player includes at least one selected from the group consisting of: a quantifiable timing input, a quantifiable aiming input, a quantifiable physical strength input, a quantifiable knowledge input, a quantifiable reasoning input, and a quantifiable strategy input.

23. The non-transitory computer readable medium of claim 17, wherein at least one of any determined award and the maintained progressive award is at least one selected from the group consisting of: a quantity of monetary credits, a quantity of non-monetary credits, a quantity of promotional credits, and a quantity of player tracking points.

* * * * *